United States Patent [19]

Muroi et al.

[11] Patent Number: 4,477,636

[45] Date of Patent: Oct. 16, 1984

[54] HOT-MELT ADHESIVE AND METHOD

[76] Inventors: Soichi Muroi, No. 651-50, Higashibara, Numazu-shi, Shizuoka-ken; Shigetoshi Seta, No. 3-4, Todoroki 8-chome, Setagaya-ku, Tokyo; Yoshio Matsumoto, No. 225, Mizushiri-cho, Nobeoka-shi, Miyazaki-ken; Koichi Yasui, No. 2-4901, Nakagawara-cho, Nobeoka-shi, Miyazaki-ken; Kazuyoshi Imamura, No. 3-1, Nakagawara-cho 2-chome, Nobeoka-shi, Miyazaki-ken, all of Japan

[21] Appl. No.: 392,699

[22] Filed: Jun. 28, 1982

Related U.S. Application Data

[63] Continuation of Ser. No. 11,648, Feb. 12, 1979, abandoned.

[30] Foreign Application Priority Data

Feb. 13, 1978 [JP] Japan .................................. 53-14122

[51] Int. Cl.$^3$ ........................ C08L 67/02; C08L 67/06
[52] U.S. Cl. .................................... 525/444; 528/303; 528/306; 523/206
[58] Field of Search ............... 528/298, 303, 304, 306; 525/444; 523/206

[56] References Cited

U.S. PATENT DOCUMENTS 3,271,353 9/1966 Szawlowski et al. ............... 523/206

FOREIGN PATENT DOCUMENTS 596105 4/1960 Canada ............................... 525/444

Primary Examiner—John Kight, III
Assistant Examiner—Amelia B. Yarbrough

[57] ABSTRACT

A hot-melt adhesive comprising a self-curing unsaturated polyester resin having an air-drying functional group and an average polymerization degree of 8 or more has been found to have an excellent heat resistance and a high bonding strength when it is bonding-cured under heat and pressure. If an additive selected from a polymerization initiator, a polymerization promotor and a photosensitizer is incorporated into the present air-drying, self-curing polyester resin, the curing speed is extremely increased to such an extent as cannot be expected from the conventional curing type adhesives. The incorporation of such an additive into the self-curing unsaturated polyester resin is advantageously realized in the form of composite structures of various forms, e.g., a laminate form, a core-in-sheath form and an islands-in-sea form. Such a composite hot-melt adhesive structure is useful for improving a pot life. If a thermoplastic polymer is incorporated, the resulting hot-melt adhesive is further improved with respect to bonding strength. Since the present hot-melt adhesive is solvent-free and does not contain as a crosslinking agent a vinyl monomer, it is easy to handle and environmental pollution can be advantageously avoided.

33 Claims, No Drawings

HOT-MELT ADHESIVE AND METHOD

This is a continuation of application Ser. No. 11,648, filed Feb. 12, 1979, now abandoned.

This invention relates to a hot-melt adhesive having improved properties. More particularly, the present invention is concerned with a hot-melt adhesive having excellent heat resistance and bonding strength, which comprises a self-curing unsaturated polyester.

Hot-melt adhesives are solvent-free solid adhesive materials which are used for bonding adherends by its properties of being molten under heating and being solidified under cooling. As conventional hot-melt adhesives, there are generally known those of thermoplastic polymers. Such conventional hot-melt adhesives comprise, as the base resin, a thermoplastic polymer and optionally various kinds of additives incorporated therein. As the thermoplastic polymers to be used as the base resin, there are known polymers of various types such as the types of polyethylene, polyamide, polyvinyl butyral, polyvinyl acetate, cellulose derivatives, polyester, polymethyl methacrylate, polyvinyl ether and polyurethane. As the representative example of the base resin, there can be mentioned an ethylene-vinyl acetate copolymer. As the additives, there are usually employed waxes, a plasticizer, a tackifier, a filler such as talc, clay or pearlite, an antioxidant and the like.

By the use of a hot-melt adhesive, the time required for the bonding operation can be shortened. Further, because the hot-melt adhesive is free of solvent, it has such advantages that the fear of distortion of the adherends due to the action of a solvent can be obviated and that the fear of catching fire and the hazardous influence on the workers can be eliminated.

The conventional hot-melt adhesives, however, have a great problem in heat resistance, because they contain as the base resin a thermoplastic polymer. Furthermore, it is noted that the bonding is effected, as mentioned above, by utilizing their properties of being molten under heating and being solidified under cooling. Accordingly, the conventional hot-melt adhesives have fatal defects that the once formed bonding is liable to be peeled when it is exposed to heat again and that the adhesive cannot be used for bonding parts or portions of high temperature.

As attempts for moderating such defects, Japanese Patent Application Publication No. 26935/76 proposes an adhesive in which a component forming a diallyl ester is incorporated into a hot-melt adhesive comprising, as the base resin, a polyamide to improve the heat resistance thereof. Further, Japanese Patent Application Publication No. 10636/70 discloses that the heat resistance of a urethane-based hot-melt adhesive can be improved by incorporating an isocyanate adduct and an amine salt of a carboxylic acid into a polyurethane elastomer as the base resin. However, in any of the proposed adhesives a thermoplastic resin is used as the base resin and, therefore, the improvement with respect to heat resistance is limited. Illustratively stated, in the former adhesive, it is intended to enhance the bonding strength by blending a vinyl-curing type diallyl ester into the polyamide-based hot-melt adhesive, but the method is based on a similar concept to that of the known method in which a thermosetting resin such as an epoxy resin or a phenolic resin is blended into or employed in combination with the thermoplastic resin type hot-melt adhesive, providing no considerable improvement in heat resistance. In the latter adhesive, it is intended to extinguish the thermoplasticity of the adhesive by blocking the functional groups through the cross-linking reaction caused at the time of the heat-melting of the thermoplastic polyurethane elastomer, leaving unresolved such a problem that the increase of the heat resistance depends on the cross-linking degree of the elastomer and it is practically difficult to attain a sufficient degree of cross-linking in a limited time.

On the other hand, in Japanese Patent Application Publication No. 30958/71, there is proposed an adhesive which is prepared by adding a solid vinyl monomer or allyl monomer and an organic peroxide catalyst to a solid unsaturated polyester and heating the resulting mixture to effect cross-linking so that the adhesive comprising as the base resin the polyester is cured. The feature of this prior art adhesive is in curing of the resin by cross-linking as in the aforementioned adhesive of Japanese Patent Application Publication No. 10636/1970. In this conventional adhesive the cross-linking agent and the catalyst should be mixed with the polyester to obtain a homogeneous mixture and the mixing is very troublesome. Moreover, the heat resistance of the adhesive resin depends on the cross-linking reaction between such different materials. It is very difficult to attain a sufficient degree of cross-linking in a short time.

Apart from hot-melt adhesives, there are known general curing type adhesives which include an unsaturated polyester type adhesive, a urethane type adhesive, an epoxy type adhesive and the like. These curing type adhesives have various drawbacks as compared with the hot-melt adhesives. For example, (1) the curing speed is still low; (2) the adhesive is generally difficult to handle because it is liquid at room temperature; (3) since the adhesive having a curing agent incorporated therein is liable to gel and cannot be stored for a long time, the curing agent should be added just before the application thereof; and so on.

We have made researches with a view to improving the heat resistance in polyester-based hot-melt adhesives, and have found that hot-melt adhesives having a high heat resistance can be obtained while maintaining a property of giving a high bonding strength, if a self-curing unsaturated polyester having an air-drying functional group and a specific polymerization degree is used as the base polyester. We have further found that when at least one additive selected from the group consisting of a polymerization initiator, a polymerization promotor and a photosensitizer is incorporated in the above-mentioned self-curing unsaturated polyester, there is obtained a rapid-curing hot-melt adhesive which can be cured at an extremely high curing speed while maintaining properties of giving a high heat resistance and a high bonding strength. The present invention has been made based on such novel findings.

Accordingly, it is an object of the present invention to provide a hot-melt adhesive having a high heat resistance and a high bonding strength.

It is another object of the present invention to provide a hot-melt adhesive of the above character, which is easy to handle and can be cured at an extremely high curing speed.

The foregoing and other objects, features and advantages of the present invention will be apparent to those skilled in the art from the following detailed descriptions and appended claims.

Turning to the representative conventional curing type polyester-based adhesive in which an unsaturated polyester is employed as in the hot-melt adhesive of the present invention, an explanation will be given in detail for clarifying unexpected excellent performances of the hot-melt adhesive of the present invention.

The representative conventional curing type polyester-based adhesive comprises an unsaturated polyester and a vinyl monomer incorporated therein. The conventional vinyl monomer-containing unsaturated polyester type adhesive is defective in the following points.

(i) It assumes a liquid or glutinous form at room temperature. Therefore, it cannot be used as a hot-melt adhesive and is difficult to handle, leading to restriction on the manner of transportion.

(ii) The adhesive surface caused to be in contact with air is not solidified at the time of bonding-curing of the adhesive.

(iii) Where the unsaturated polyester has no additive such as a polymerization initiator incorporated therein, the adhesive is not curable because the vinyl monomer is gasified and dissipated before the adhesive starts to cure. Therefore, it is indispensable to employ the additive.

(iv) Since the adhesive having the additive (mentioned in (iii) above) incorporated therein is liable to gel during storage, the additive should be added to the polyester just before the application of the adhesive onto the adherend. The bonding operation becomes complicated.

(v) The adhesive having a vinyl monomer incorporated therein has a high fluidity, and therefore it is liable to flow out of the adherend in conducting the bonding operation.

(vi) The mixing is necessarily conducted for forming a uniform mixture of an unsaturated polyester and a vinyl monomer. The mixing operation is troublesome and costly.

The aforementioned prior art adhesive disclosed in Japanese Patent Application Publication No. 30958/71 is effective for eliminating the drawbacks of (i) and (iv) above, but cannot overcome the drawbacks of (ii), (iii), (v) and (vi). Further, this prior art additive has the following additional drawbacks.

(vii) The cost of a vinyl monomer is increased.

(viii) The solid vinyl monomer is not so effective for increasing the curing speed as compared with the liquid vinyl monomer.

(ix) Both the main components, namely, the unsaturated polyester and the vinyl monomer are solid and therefore it is necessary to kneading them at a high temperature. It needs a long time to attain uniform mixing of the components. In addition, the mixture is liable to gel at the time of mixing.

(x) The additive should be incorporated for the reason of (iii) above. Moreover, the additive and the vinyl monomer should be present in the polyester during the time when the adhesive molten is retained in the molten state for the application of the adhesive, leading to restriction on the pot life.

On the other hand, in order to eliminate the drawback of (ii) above, it has also been proposed to introduce an air-drying functional group into the unsaturated polyester of the adhesive of an unsaturated polyester-vinyl monomer-additive system. However, even with the introduction of an air-drying function group as mentioned above, the drawbacks of (i), (iii), (iv), (v) and (vi) are fatal. Even though the solid polyester and the solid vinyl monomer are used as disclosed in Japanese Patent Application Publication No. 30958/1971, the drawbacks of (iii), (iv), (v) and (vi) still remain unremoved and there are brought about the defects of (vii), (viii), (ix) and (x).

As mentioned before, according to the present invention, all the drawbacks and disadvantages can be effectively obviated by the use of a self-curing unsaturated polyester with an air-drying functional group introduced thereinto.

In accordance with one and an essential aspect of the present invention there is provided a hot-melt adhesive comprising a self-curing unsaturated polyester resin having one or more air-drying functional groups and an average polymerization degree of 8 or more, said adhesive being capable of performing bonding-curing under heat and pressure.

As will be detailedly mentioned later, the air-drying, self-curing solid unsaturated polyester resin having a polymerization degree of 8 or more may be used itself or may be used in the form of a composition containing the resin. Furthermore, it is to be noted that if at least one member selected from the group consisting of a polymerization initiator, a polymerization promoter and a photosensitizer or a composition containing the same is incorporated into the polyester resin, the curing speed of the hot-melt adhesive can be remarkably increased.

A self-curing unsaturated polyester without an air-drying functional group being introduced thereinto is not curable by itself, and even if the additive such as a polymerization initiator is incorporated into the above-mentioned polyester, the polyester, though it has a little self-curing property, is extremely low with respect to curing speed and curing degree and insufficient in bonding strength, so it cannot be used as a hot-melt adhesive. By the present inventors, however, it has surprisingly been found that only by introducing a small quantity of an air-drying functional group into the self-curing unsaturated polyester there can be obtained an excellent hot-melt adhesive which is free of the aforementioned drawbacks inevitably accompanying the conventional adhesives.

The air-drying functional group, in itself, serves to suppress a curing inhibition by oxygen in air and/or to promote a curing reaction through generation of radicals by bonding with oxygen in air. However, in the case of an adhesive of an unsaturated polyester-vinyl monomer-additive (e.g. polymerization initiator) system, even though the air-drying functional group is introduced into the polyester, the effect of the introduction of the air-drying functional group is not appreciable. As opposed to this, according to the present invention, the curing speed and curing degree are extremely increased only by introducing a small quantity of an air-drying functional group to a self-curing unsaturated polyester resin having a polymerization degree of 8 or more. The reason for this is not exactly known, but it is believed that the self-curing unsaturated polyester resin having an air-drying functional group and an average polymerization degree of 8 or more itself has a thermosetting property and this property of the polyester resin exerts various excellent performances as compared with the thermoplastic resin-based adhesive in which a cross-linking agent is incorporated to attenuate the thermoplasticity of the base resin.

In the hot-melt adhesive of the present invention, therefore, a cross-linking agent such as a vinyl compound or an allyl compound need not be additionally incorporated. Accordingly, the additional procedures for uniformly mixing the base resin and the cross-linking agent are not necessary. Further, as different from the conventional rapid-curing type adhesives, there can advantageously be removed such a troublesome problem that the polymerization initiator or curing agent should be mixed with the base material of an adhesive just before the bonding operation. Since the air-drying, self-curing unsaturated polyester resin is solid at room temperature, it can be readily provided in the form of a powder, a chip, a flake, a fiber, a tape, a rope, a film and a bulk so that it can be easily handled. The hot-melt adhesive of the present invention has an excellent bonding strength, particularly a high T-peel bonding strength as compared with the conventional hot-melt adhesives comprising as the base resin a thermoplastic polymer such as an ethylene-vinyl acetate copolymer, polyethylene, atactic polypropylene or the like.

The hot-melt adhesive of the present invention has a superior heat resistance to those of the conventional hot-melt adhesives. In addition, it should be noted that by incorporating a polymerization initiator, a polymerization promotor or a photosensitizer, the curing speed of the present hot-melt adhesive is remarkably improved. As compared with the general curing type epoxy- or urethan-based adhesives which are known as the heat-resistant and solvent-resistant type ones, the curing speed of the hot-melt adhesive of the present invention is far superior. Even when compared with not only the conventional thermoplastic resin-based hot-melt adhesive in which a thermosetting resin is incorporated but also the conventional thermosetting resin-based hot-melt adhesive in which a cross-linking agent is incorporated, the hot-melt adhesive of the present invention has a curing property as high as a few times. Where the additive such as a polymerization initiator or the like is incorporated, the resulting hot-melt adhesive of the present invention does, in bonding-curing under heat and pressure, manifest a high curing speed as compared with any types of conventional adhesives.

As is apparent from the foregoing description, the defects and disadvantages as accompanying conventional hot-melt adhesives and general curing type adhesives can be completely eliminated in the hot-melt adhesive of the present invention. The epoch-making hot-melt adhesive of the present invention can be manufactured at a low cost and can be effectively used without causing environmental pollution in the practical applications where high heat resistance is required, for example, in the applications for bonding of electric parts and automobile parts and for body sealing of automobiles. Accordingly, the hot-melt adhesive of the present invention has a wide variety of uses and can be used with great industrial advantages.

The self-curing unsaturated polyester constituting the hot-melt adhesive of the present invention is a polyester prepared from, as main raw materials, a polybasic carboxylic acid component and a polyhydric alcohol component. According to need, a monobasic carboxylic acid component and a monohydric alcohol component may be additionally employed as terminal blocking agents. In the present invention, at least one of these components should include, at least in part, a compound having an air-drying functional group. Either the acid component or alcohol component may be all or partially those having an air-drying functional group, or both of the acid component and alcohol component may be all or partially those having an air-drying functional group.

In the present invention, the term "air-drying" is intended to indicate such a property that when an unsaturated polyester resin is cured, polymerization inhibition by oxygen in air is suppressed and/or autoxidation with oxygen in air is readily advanced, and the term "air-drying functional group" is intended to mean a functional group capable of imparting the above-mentioned "air-drying" property to the unsaturated polyester resin.

Any of known air-drying functional groups may be introduced, without limitation of the kind thereof, into the self-curing unsaturated polyester constituting the hot-melt adhesive of the present invention. The air-drying functional group to be present in the self-curing unsaturated polyester resin may be introduced into the main chain, said chains and/or terminals of the polyester resin. The rate of the component having an air-drying functional group (air-drying component) to be introduced into the self-curing unsaturated polyester resin may preferably be 0.001 or more equivalent/100 g of the resin, more preferably 0.01 or more equivalent/100 g of the resin. The air-drying functional group may preferably be selected from unsaturated aliphatic groups, saturated alicyclic groups, unsaturated alicyclic groups, saturated heterocyclic groups, unsaturated heterocyclic groups, groups having active methylene and groups having active methine.

As one class of preferred unsaturated aliphatic groups, a pendant vinylidene group, a pendant vinyl group and a pendant allyl group can be mentioned and they act as the air-drying functional group. As the raw materials for providing these types of unsaturated aliphatic groups, there can be mentioned itaconic acid, dimethyl α-methylene δ-methyladipate, glycerol monoallyl ether, N-allyldiethanolamine and the like. As another class of preferred unsaturated aliphatic groups, there can be mentioned those unsaturated aliphatic groups having 6 to 20 carbon atoms which groups preferably contain as the structural unit vinylene, particularly preferably 1,4-pentadienylene and/or 1,3-butadienylene. As the raw materials for providing such unsaturated aliphatic groups, there can be mentioned sorbic acid, decenoic acid, oleic acid, cetoleic acid, linoleic acid, linolenic acid, hiragoic acid, eleostearic acid, moroctic acid, eicosatetraenoic acid, eicosapentaenoic acid, ricinoleic acid, stearolic acid, isanic acid, licanic acid, sorbyl alcohol, oleyl alcohol and the like.

Preferred saturated alicyclic groups may be selected from groups having an unsubstituted or substituted norbornane ring, groups having an unsubstituted or substituted tricyclodecane ring and groups having an unsubstituted or substituted pentacyclopentadecane ring. As the raw materials for providing such saturated alicyclic groups, there can be mentioned

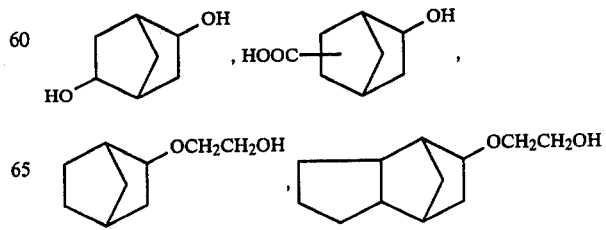

and the like.

Preferred unsaturated alicyclic groups may be represented by those groups having a member selected from a cyclopropene ring, a norbornene ring, a tricyclodecene ring, a pentacyclopentadecene ring and a cyclohexene ring, and substituted groups thereof. As the raw meterials for providing such unsaturated alicyclic groups, there can be mentioned $CH_3(CH_2)_7 \Delta(CH_2)_7COOH$ (sterculic acid),

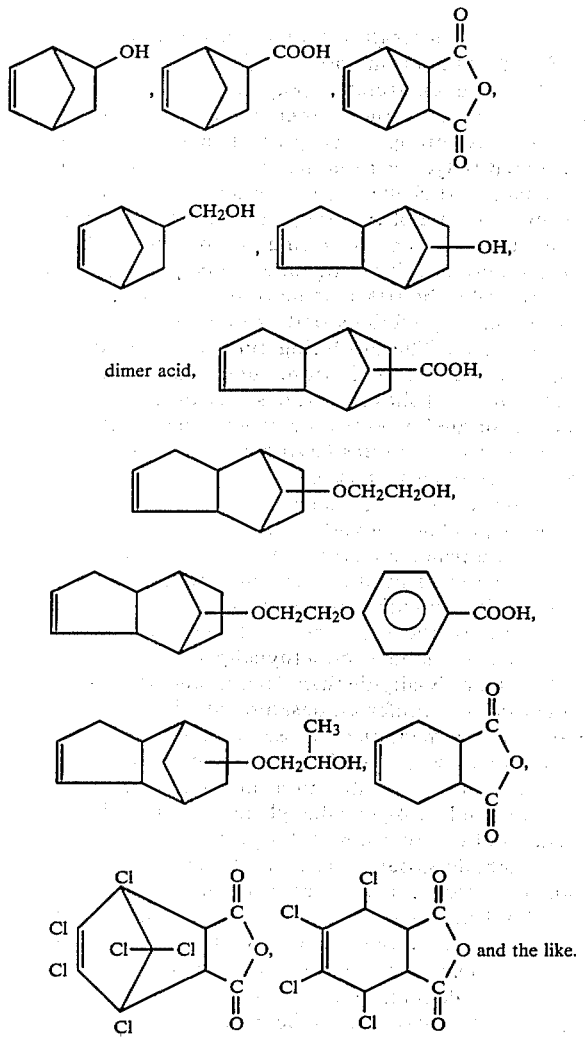

dimer acid,

Preferred saturated heterocyclic groups may be represented by those groups having a member selected from a tetrahydrofuran ring and a five-membered acetal ring, and substituted groups thereof. As the raw materials for providing such saturated heterocyclic groups, there can be mentioned

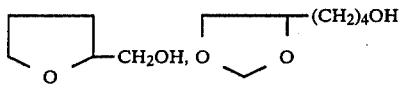

and the like. In this connection, reference may be made to U.S. Pat. No. 3,210,441.

Unsaturated heterocyclic groups may be represented by those groups having a furan ring, and substituted groups thereof. Furfuryl alcohol is a representative example of the raw materials for providing such unsaturated heterocyclic groups.

Groups having active methylene or methine include those groups having methylene or methine between a benzene ring and ether oxygen, between vinyl and ether oxygen, between two vinylene, between benzoyl and carbonyl, or between an epoxy residue and ether oxygen, and substituted groups thereof. As specific examples of such groups, there can be mentioned a benzyl ether group, an allyl ether group, a benzoylacetate group, a glycidyl ether residue and a ,4-pentadienylene group. As the compounds having allyl ether for providing a group having active methylene or methine, there can be mentioned allyl cellosolve, glycerol monoallyl ether, glycerol diallyl ether, trimethylolpropane diallyl ether, pentaerythritol dially ether, trimethylolpropane monoallyl ether, diglycerol diallyl ether, pentaallyloxymethylmonomethylolmelamine, allyl glycidyl ether and the like. Specific examples of the compounds having a benzyl ether group include those compounds having benzyl ether in place of allyl ether in the above-specified compounds having allyl ether, such as benzyl cellosolve and trimethylolpropane monobenzyl ether. Specific examples of the compounds having a benzoylacetate group include methyl benzoylacetate and benzoylacetic acid. As the compounds for providing a glycidyl ether residue, there can be mentioned phenyl glycidyl ether, butyl glycidyl ether, ethylene glycol monoglycidyl ether and the like. A glycidyl ether group has a high probability that the ring of the glycidyl ether group would open at the time of the preparation of a self-curing unsaturated polyester resin constituting the hot-melt adhesive of the present invention so that the glycidyl ether group takes part in copolymerization to be bonded to main chain of the polyester resin, but even if copolymerized, the glycidyl ether group imparts a self-curing property to the polyester resin. Specific examples of the compounds having 1,4-pentadienylene include linoleic acid, linolenic acid and the like which are mentioned as the raw materials for providing the unsaturated aliphatic groups.

With respect to air-drying functional groups such as mentioned above, reference may also be made to the following literature.

(1) Kobunshi (Polymer), vol. 13, No. 147, pp. 419–424 (1975).
(2) Kobunshi Kako (Processing of Polymer), vol. 24, No. 282, pp. 248–250 (1975).
(3) Journal of Oil Color Chemist Association, vol. 44, pp. 42 (1961).
(4) Kazuyuki Mihara, Kaisetsu Toryogaku (Explanatory Paint Technology) (Tokyo: Riko Shuppansha K.K., June 1975) Chapter 12.

The term "self-curing unsaturated polyester" as used herein is intended to indicate those polyesters capable of being cured themselves without addition of a vinyl monomer. Usually, those polyester resins may have a double bond concentration of at least 0.05 equivalent/100 g of the resin, preferably at least 0.1 equivalent/100 g of the resin. The double bonds are usually present in the air-drying functional groups and/or the $\alpha,\beta$-unsaturated dicarboxylic acid residue of the polyester. The polyester resin having double bonds only in the air-drying functional groups is liable to give a slow curing speed. Therefore, it is preferred that the polyester resin have double bonds in both of the air-drying functional groups and the α,β-unsaturated dicarboxylic acid residue.

As the preferred polybasic carboxylic acid that is used for the preparation of a self-curing unsaturated polyester constituting the hot-melt adhesive of the present invention, there can be mentioned, for example, aromatic carboxylic acids such as terephthalic acid, isophthalic acid, phthalic acid, naphthalene-1,5-dicarboxylic acid, naphthalene-2,6-dicarboxylic acid, diphenyl-4,4'-carboxylic acid, p,p'-methylene dibenzoic acid, p,p'-ethylene dibenzoic acid and bis(p,p'-dicarboxyphenoxy) ethane; aliphatic dicarboxylic acids such as succinic acid, adipic acid, azelaic acid, sebacic acid, 1,10-decanedicarboxylic acid; and α,β-unsaturated dicarboxylic acids such as fumaric acid and maleic acid. Acid anhydrides and ester derivatives of these polybasic carboxylic acids can also be used. They may be used either alone or in combination.

As the preferred polyhydric alcohol that is used for the preparation of a self-curing unsaturated polyester constituting the hot-melt adhesive of the present invention, there can be mentioned, for example, ethylene glycol, propylene glycol, neopentyl glycol, cyclohexane-1,4-diol, 1,4-butanediol, cyclohexane-1,4-dimethanol, hydrogenated bisphenol A and 2,2-bis[4-(β-hydroxyethoxy)phenyl] propane. Oligomers of the above-mentioned glycols may also be used. They may be used either alone or in combination. Further, hydroxy-carboxylic acids such as hydroxybenzoic acid and hydroxystearic acid may be optionally used for the preparation of the polyester.

It is preferred that the residue of the alcohol component in a self-curing unsaturated polyester constituting the hot-melt adhesive of the present invention consist mainly of the residue of a saturated linear aliphatic glycol having 4 to 10 carbon atoms. When a hot-melt adhesive comprising as the main component a polyester having such a glycol residue is used for bonding, an improved bonding strength, especially T-peel strength, can be obtained.

It is important that a self-curing unsaturated polyester resin constituting the hot-melt adhesive of the present invention should have an average polymerization degree of 8 or more. If the average polymerization degree is lower than 8, the polyester resin is ordinarily in a liquid or glutinous state, and even if the polyester resin is solid, it shows an unfavorable high tack. Accordingly, such a polyester resin cannot be used for a hot-melt adhesive, and even if it is used for the adhesive, the polyester resin cannot give a satisfactory bonding strength after bonding and curing. From the viewpoints of increase of bonding strength and improvement of antiblocking tendency, the average polymerization degree of the polyester resin is preferably 12 or more, more preferably 15 or more.

From the viewpoint of easiness in handling, a self-curing unsaturated polyester resin constituting the hot-melt adhesive of the present invention is desired to have a melt viscosity, as measured at 200° C., of 10,000 poises or less, preferably 2,000 poises or less, more preferably 1,000 poises or less.

A self-curing unsaturated polyester resin having an air-drying functional group to be used in the hot-melt adhesive of the present invention is desired to have a softening point of 35° C. to 200° C., preferably 45° C. to 150° C. If the softening point is less than 35° C., the polyester resin assumes a liquid state in the hot summer season, and, hence, cannot serve for the hot-melt adhesive. On the other hand, if the softening point is more than 200° C., the polyester resin cannot enjoy a sufficient pot life, because the hot-melt adhesive must be heated to a high temperature for its melting.

The self-curing unsaturated polyester resin of the hot-melt adhesive of the present invention can be prepared according to known polyester-forming methods, for example, a method in which a polybasic carboxylic acid and a polyhydric alcohol are subjected to dehydration, followed by polycondensation to form a polyester, or a method in which an alkyl ester of a polybasic carboxylic acid and a polyhydric alcohol are subjected to ester exchange, followed by polycondensation to form a polyester. These methods may also be combined for the preparation of a polyester. In preparing the polyester resin for the hot-melt adhesive of the present invention, it is preferred, from the viewpoint of increase of polymerization degree in a short time, to adopt a method in which polycondensation is carried out under reduced pressure in the latter stage of the polyester-forming reaction. The dehydration reaction and polycondensation reaction are preferably carried out at a temperature of 210° C. or less and especially in the polycondensation, the reaction temperature is more preferably 200° C. or less.

In order to prevent the gelation of the reaction mixture during esterification (dehydration) or polycondensation, it is preferred that a polymerization inhibitor be added to the reaction mixture at the time of charging of the raw materials or at an appropriate stage of the reaction. As the polymerization inhibitor that may be used for such a purpose, there can be mentioned, for example, p-benzophenone, naphthoquinone, hydroquinone, p-tert-butylcatechol, di-tert-butyl-p-cresol, α-naphthol, copper naphthenate, phenylhydrazine chloride, and N-trimethyl benzylammonium chloride.

When the self-curing unsaturated polyester resin as explained hereinbefore is used for the hot-melt adhesive of the present invention, it may be used itself alone but may also be used in the form of a composition in which one or more other components are incorporated. Such other components include a thermoplastic polymer; an additive selected from a polymerization initiator, a polymerization promotor and a photosensitizer; a curing component such as a melamine resin, an isocyanate, an acid anhydride or an epoxy compound; and other various additives such as a pigment, a plasticizer, a fire retardant, etc. When the air-drying, self-curing unsaturated polyester resin is used in the form of a composition containing no thermoplastic polymer, an amount of the unsaturated polyester resin in the composition is not critical, but in general there may be employed in an amount of about 50% or more by weight, preferably 70% or more by weight based on the composition. When the composition contains as the component a thermoplastic polymer, the air-drying, self-curing unsaturated polyester resin may be employed in an amount such as provides an air-drying group concentration and a double bond concentration as will be specified later.

As the thermoplastic polymer that may be used in the composition, there can be mentioned, for example, polyesters, polyamides, polyolefins, polyvinyl acetate, polyvinyl chloride and acrylic polymers. Especially good results may be obtained when the self-curing unsaturated polyester resin is used in combination with a thermoplastic polyester resin. More specifically, where the thermoplastic polyester resin for conventional polyester type hot-melt adhesives is incorporated in the self-curing unsaturated polyester resin, the hot-melt adhesive exhibits improved performances such as an appropriate melt viscosity and an increased tensile bonding strength without losing excellent heat resistance inherent of the self-curing unsaturated polyester resin. As such thermoplastic polyester resins, there can be used those having a softening point of 200° C. or less, preferably 120° C. or less, such as polyethylene terephthalate adipate, polybutylene terephthalate adipate, polyethylene terephthalate azelate, polybutylene terephthalate sebacate, polyhexamethylene terephthalate adipate, polybutylene terephthalate glutarate, polyneopentylene terephthalate dodecanedicarboxylate, polybutylene terephthalate isophthalate adipate and polybutylene terephthalate isophthalate azelate. In the case of the hot-melt adhesive composition, it is preferred that the concentration of air-drying functional groups in the composition be 0.001 or more equivalent/100 g of the composition, preferably 0.01 or more equivalent/100 g of the composition. If the concentration of air-drying functional groups is less than 0.001 equivalent/100 g of the composition, the curing speed and curing degree may be insufficient and the heat resistance after bonding may be low. In the case of the hot-melt composition, it is preferred that the concentration of double bonds be at least 0.05 equivalent/100 g of the composition, preferably at least 0.1 equivalent/100 g of the composition.

Moreover, polymer chains of a different kind such as epoxy or polyether chains may be introduced into the terminals or the side chains of the self-curing unsaturated polyester to form a block or graft copolymer. Such a copolymer is also useful as the self-curing unsaturated polyester resin to be used for the hot-melt adhesive of the present invention so far as it retains a self-curing property.

Furthermore, at least one additive selected from a polymerization initiator, a polymerization promotor and a photosensitizer may preferably be incorporated into the self-curing unsaturated polyester resin to further improve the hot-melt adhesive of the present invention. The former two additives are effective for improving the heat-curing speed remarkably, and the last-mentioned additive imparts to the hot-melt adhesive special functions such as photocuring bonding.

Known radical polymerization initiators may be used as the polymerization initiator. Specific examples of the polymerization initiators include hydrogen peroxide; persulfates such as potassium persulfate, sodium persulfate and ammonium persulfate; dialkyl, diaralkyl, alkyl aralkyl or alkyl aryl peroxides such as di-tert-butyl peroxide, dicumyl peroxide and tert-butyl cumyl peroxide; diacyl peroxides such as acetyl peroxide, propionyl peroxide, lauroyl peroxide, decanoyl peroxide, succinyl peroxide and benzoyl peroxide and derivatives thereof; ester peroxides such as di-tert-butyl diperoxyisopthalate, tert-butyl peroxybenzoate, tert-butyl peroxy isopropyl carbonate and 2,5-dimethyl-2,5-di(benzoylperoxy) hexane; hydroperoxide compounds such as tert-butyl hydroperoxide, cumene hydroperoxide, diisopropylbenzene hydroperoxide, 2,5-dimethylhexane 2,5-dihydroperoxide, 1,1,3,3-tetramethylbutyl hydroperoxide; ketal peroxides such as 1,1-bis(tert-butyl-peroxy) cyclohexane and n-butyl 4,4-bis(tert-butyl-peroxy)valerate; peroxycarbonates such as diisopropyl peroxydicarbonate, di-n-propyl peroxydicarbonate and di-2-ethoxyethyl peroxydicarbonate; metallic peroxide compounds such as organometallic peroxides wherein the metal is Si, Ge, Sn, Cd, Pd or the like and the organic moiety is $(C_1-C_5)$ alkyl, phenyl or naphthyl; azo compounds such as azobisisobutyronitrile and $(C_1-C_5)$ alkyl esters of azobisisobutyric acid; 2,5-dimethyl-2,5-di(t-butylperoxy)hexyne-3; and 1,1-bis(t-butylperoxy) cyclohexane. They may be used either alone or in mixture. Polymerization initiators that may be used in the hot-melt adhesive of the present invention are not limited to those specifically mentioned above. The polymerization initiator may preferably be incorporated in an amount of 0.005 to 10% by weight, more preferably 0.05 to 5% by weight, based on the air-drying, self-curing unsaturated polyester. When the amount of the polymerization initiator is smaller than 0.005% by weight, the effect is small, and when the amount is larger than 10% by weight, such a danger as fire or explosion is entailed.

Where a polymerization initiator is used in the hot-melt adhesive of the present invention, appropriate choice of the polymerization initiator is important. In the ordinary procedures of bonding, the hot-melt adhesive which is solid at room temperature is first molten, then applied to an adherend and lastly cured to effect bonding. Accordingly, the hot-melt adhesive is usually required to be stable for a long time in the molten state (thermally stable without gelling). In other words, the hot-melt adhesive is usually required to have a long pot life. Therefore, the polymerization initiator that may be incorporated into the hot melt adhesive is desired to have such a property that though it is not decomposed during the time when the hot-melt adhesive is in the molten state, it is decomposed when the temperature is elevated to a curing temperature. More specifically, the hot-melt adhesive is desired to have such a property that it becomes liquid at a high temperature, for example, at about 100° C. and it is cured at a further high temperature, for example, at about 170° C. For providing a hot-melt adhesive having such a property, it is preferred that the half-life (half-value period) of the polymerization initiator be 1 minute or more as measured at 120° C. When a further sufficient pot life is desired, it is preferred that the half-life be 1 minute or more as measured at 140° C. In the case where there is used a polymerization initiator having a half-life of less than 1 minute as measured at 120° C., the hot-melt adhesive tends to often start to cure just after melting of the adhesive, and, hence, a sufficient pot life of the adhesive may not be secured.

As the polymerization promoter that may be used in the hot-melt adhesive of the present invention, there can be mentioned, for example, metallic soaps such as lead naphthenate, manganese naphthenate, copper naphthenate and zinc naphthenate; metal chelate compounds such as cobalt acetylacetate; amine compounds such as N-dimethylaniline, triethanolamine and pyridine; known phosphorus-containing compounds such as phenylphosphinic acid, diphenylhydroxyphosphine and dimethylphosphine; and known sulfur-containing compounds such as 1,3-dibutylthiourea. They may be used either alone or in mixture. Polymerization promotors that may be used are not limited to those specifically mentioned above. The polymerization promotor may preferably be incorporated in an amount of 0.001 to 5% by weight, more preferably 0.01 to 2% by weight, based on the air drying, self-curing unsaturated polyester resin. When the amount of the polymerization promotor is smaller than 0.001% by weight based on the polyester resin no substantial promoting effect can be obtained. When the amount of the polymerization promotor is larger than 5% by weight, there is recognized no substantial further improvement corresponding to the increased amount of the promotor.

The metallic soaps are especially useful as the polymerization promotor. When the applied hot-melt adhesive layer is thin, when the applied hot-melt adhesive is exposed to air as in the case where the adhesive is used as a sealant or for bonding of an interlining or padding cloth, or when complete curing of the applied-adhesive layer up to the internal portion thereof is not required but curing of only the surface portions of the adhesive layer is satisfactory for the intended bonding, even the incorporation of a metallic soap alone into the air-drying, self-curing unsaturated polyester may give satisfactory results. However, the polymerization promotor is ordinarily used in combination with a polymerization initiator for improving the curing speed of a resin. It is noted that with respect only to an air-drying property (a property that curing of a resin is initiated at the air-contacting portions of the resin to give rise to skinning), the metallic soap can exert an excellent effect even without the aid of the polymerization initiator. Metallic soaps are prominent in providing such an air-drying property among various kinds of polymerization promotors. When the metallic soap is used in combination with a polymerization initiator and/or a photosensitizer, the air-drying speed can be remarkably improved. On the other hand, in the case of the hot-melt adhesive of the present invention in which the metallic soap is singly incorporated, as the additive, even if the adhesive is kept at a high temperature, curing does not take place insofar as the adhesive is shielded from air, and hence a long pot life can be obtained even at a high temperature. Although the nozzle portion of an applicator is always in contact with air, since an air-dried adhesive film formed at the nozzle portion is very thin, no trouble is caused in actual application of the hot-melt adhesive of the type as mentioned above.

The term "photosensitizer" as used herein is intended to indicate a compound capable of initiating the polymerization of the self-curing unsaturated polyester resin under irradiation of actinic rays. As the photosensitizer that may be used in the hot-melt adhesive of the present invention, there can be mentioned, for example, peroxides such as benzoyl peroxide; azo compounds such as azobisisobutyronitrile; sulfides such as dibenzothiazolyl disulfide and tetramethylthiuram disulfide; and compounds having a benzoyl group such as benzophenone, benzil, benzoin, benzaldehyde and substituted compounds thereof. They may be used either alone or in mixture. Photosensitizers that may be used are not limited to those as specifically mentioned above. The amount of the photosensitizer that may be used in preferably 0.005 to 10% by weight, more preferably 0.05 to 5% by weight, based on the air-drying, self-curing unsaturated polyester resin.

Among the additives that may be used in the hot-melt adhesive of the present invention, a photosensitizer is used in the case where the hot-melt adhesive may be cured under the irradiation of actinic rays. The photosensitizer may preferably be used in combination with a polymerization promoter to improve the photocuring speed of the adhesive. Where the photocuring of the adhesive may be effected together with the heat-curing, the photosensitizer is used in combination with a polymerization initiator and optionally a polymerization promoter. The photosensitizer may be used in the adhesive where actinic rays can, more or less, stream into the layer of the applied adhesive, for example, where at least one of adherends is transparent or translucent, or where the curing of the adhesive can proceed with the irradiation of actinic rays from the side of the applied adhesive layer as in the case where the width of the adhesive layer is small. When the photosensitizer is used in the hot-melt adhesive without the use of the polymerization initiator, a long pot life of the adhesive can be obtained along with a high curing speed of the adhesive.

The above-mentioned additive selected from the polymerization initiator, polymerization promoter and photosensitizer as mentioned above may be used either as such or in combination with a base substance to form an additive composition. Any base substance may be used so far as it is capable of containing the additive to be incorporated thereinto and has a good compatibility with the self-curing unsaturated polyester resin to be used for the hot-melt adhesive of the present invention. Specific examples of such base substances include polyesters such as polyethylene terephthalate adipate, polybutylene terephthalate adipate, polyethylene terephthalate azelate, polybutylene isophthalate sebacate, polyhexamethylene terephthalate adipate, polybutylene terephthalate glutarate, polyneopentylene terephthalate dodecanedicarboxylate, polybutylene terephthalate isophthalate adipate and polybutylene terephthalate isophthalate azelate; and polyamides such as homopolymers and copolymers of nylon 6, nylon 6T, nylon 6/6 nylon 6/10, nylon 6/12, nylon 12 and dimer acid-based polyamides. Oligomers corresponding to the polymers as mentioned above may also be used. The above-mentioned polymers and oligomers are desired to have a softening point of 200° C. or less, preferably 120° C. or less. Those polyesters having a high compatibility with the self-curing unsaturated polyester resin are especially preferred. The advantages of providing the composition containing the additive reside in that a danger such as explosion of the additive can be eliminated, that the composition is easy to handle as compared with the additive alone, and that incorporation of the composition into the air-drying, self-curing unsaturated polyester resin is easy to conduct as compared with that of the additive alone.

As described hereinbefore, at least one additive selected from a polymerization initiator, a polymerization promotor and a photosensitizer may preferably be incorporated into the air-drying, self-curing unsaturated polyester resin, so that the hot-melt adhesive according to the present invention may cure rapidly. The incorporation of the additive into the unsaturated polyester resin may be realized by providing various forms. According to broad classification, one form is a blend and another form is a composite structure. In the case of a blend, the additive is incorporated into the unsaturated polyester resin by blending. The blending must be carried out at a temperature at which the decomposition of the additive does not occur during the blending operation. As one of the blending methods, melt-blending may be utilized if the decomposition of the additive is not caused at a temperature adopted for the melt-blending. In the case where it is desired to effect bonding-curing of the hot-melt adhesive at a relatively low temperature, the additive, especially the polymerization initiator, must be of the type capable of decomposing at a relatively low temperature, and, hence, melt-blending may not be adopted. In such a case, it is preferred to adopt forced blending. The term "forced blending" as used herein indicates a method in which components to be blended are broken or crushed at a temperature lower than the melting point of at least one of the components by using a very strong force generated by a mechanical means to effect uniform mixing. In general, the forced blending can be accomplished by using a mixing machine of the type capable of giving a strong force to the agitating blades.

In the case of a composite structure, it comprises in combination a component A (the air-drying, self-curing polyester resin or a composition containing the same) and a component B (the additive or a composition containing the same). The composite structure may practically be of a laminate form, a core-in-sheath form or an islands-in-sea form. The advantages of such a composite structure reside in that the hot-melt adhesive is not of a two-pack type but of a one-pack type and that the hot-melt adhesive can be maintained in the molten state without gelling for a long time (long pot life).

The laminate form and the core-in-sheath form is usefully applicable especially when the hot-melt adhesive of the present invention is produced in the form of a fiber, a rope, a film or a tape. The term "laminate form" as used herein is intended to indicate such a structure that the component A and the component B are arranged to provide a laminate, optionally a multilayer laminate comprising alternating layers of different components, as viewed in cross section of the structure cut perpendicularly to the longitudinal or lateral direction thereof, with the interface between both the components being either straight or curved. The term "core-in-sheath form" as used herein is intended to indicate such a structure that one of the components A and B is sheathed in the other. In the composite structure of either the laminate form or the core-in-sheath form, between both the components A and B, there may preferably be interposed a screening medium made of a material other than the materials of the components A and B so that both the components are not easily intermixed with each other in preparing and/or melting the composite structure.

The term "islands-in-sea form" as used herein is intended to indicate such a structure that one of the components A and B is present in the other in the arrangement of so-called islands-in-sea, as viewed in cross section of the structure. The shape of the component constituting the islands is not limited and may be, for example, of granule, strip or tube. Further, the islands may be present in the form of microcapsules each encapsulating therein one of the components A and B. Such microcapsules as the islands may be prepared by various methods, for example, a method as disclosed in the Report "Microcapsules ni Kansuru Sogochosa (Comprehensive Researches on Microcapsules)" published by Kobunshi Shijo Kenkyusho (Market Research Institute for High Polymers, Japan) in May 1970, or a method in which a saturated polyester having the additive incorporated therein (component B) is dispersed in the air-drying, self-curing unsaturated polyester resin (component A) to form hardened coat skins in the interfaces between the components A and B so that there are formed, as islands, microcapsules encapsulating therein the component B. It is noted that the islands may be of a saturated polyester having the additive mixed therewith.

In practical use, both components A and B in the abovementioned various kinds of composite structures of hot-melt adhesive are melt-blended with each other just before initiation of the curing reaction. As the method of the melt-blending, there can be mentioned, for example, in-line melt-blending near the nozzle of an applicator, melt-blending by means of a static mixer and melt-blending by pressure applied through adherends to the molten components A and B. The best method of the melt-blending is chosen taking into consideration the type and form of the adhesive etc.

The fiber-, rope-, or chip-type composite structure of hot-melt adhesive of the laminate form, core-in-sheath form or islands-in-sea form may be produced by extrusion using a composite type spinneret which is known in the art. The chip-, flake-, film-, tape- or powder-type composite structure of hot-melt adhesive of the islands-in-sea form may be produced, for example, by adding the additive or a composition containing the same (component B) in the form of granules, strips or the like to the air-drying, self-curing unsaturated polyester resin or the composition containing the same (component A). However, the methods of producing the composite structures of hot-melt adhesive of various forms are not limited.

In accordance with another aspect of the present invention, there is provided a method of bonding adherends, which comprises:

applying, onto the surface of at least one of a plurality of adherends having their respective surfaces to be bonded, a hot-melt adhesive comprising a self-curing unsaturated polyester resin having one or more air-drying functional groups and an average polymerization degree of 8 or more, said adhesive being capable of performing bonding-curing under heat and pressure; and effecting curing of the adhesive under heat and pressure while said plurality of adherends are mutually in association, through said adhesive, at their respective surfaces to be bonded, thereby to bond the adherends.

In effecting bonding of adherends, according to the instant aspect of the present invention, the manner of application of the hot-melt adhesive is not limited. For example, if the number of the adherends is two, the adhesive may be applied onto one or both of the adherends. If the number of the adherends is four, the adhesive may be applied onto any number of the adherends, i.e. one, two, three or four.

The hot-melt adhesive of the present invention may be applied onto the surface of at least one of adherends and the adherends are then put into mutual contact through the adhesive interposed therebetween. Alternatively, a plurality of adherends may be securely combined to have a narrow spacing therebetween, and the adhesive may be then applied into the narrow spacing.

When curing of the adhesive is effected, it is necessary that the adherends are mutually in association, through the hot-melt adhesive, at their respective surfaces to be bonded. The usual manner for keeping the adherends to be mutually in association is to dispose the adherends so as to be in mutual contact through the adhesive interposed therebetween. Furthermore, the method of the present invention may be effectively utilized to bond an adherend to other adherend by interposing no adhesive therebetween but by, for example, applying a hot-melt adhesive to the angular portion formed by an adherend resting on other adherend at its upper surface having an area larger than that of the lower surface of the former adherend. In such a case, the former adherend and the latter adherend are not in mutual contact through the adhesive interposed therebetween.

When the curing of the adhesive is effected under heat alone without application of pressure, a sufficient bonding strength cannot be obtained. Under pressure alone and without heating, the bonding is also not sufficient.

The heating temperature of the hot-melt adhesive of the present invention varies depending on the kinds of an adhesive and adherends, the desired heating time and the like. In general, the heating temperature may be in the range of from the softening temperature of the adhesive to 300° C., preferably in the range of from a temperature 30° C. higher than the softening temperature of the adhesive to 250° C. The heating time (heating time after the hot-melt adhesive is applied onto the adherend) of the hot-melt adhesive of the present invention varies depending on the kinds of an adhesive and adherends, the heating temperature and the like. In general, the heating time may be in the range of from 5 seconds to 30 minutes in the case of a hot-melt adhesive containing at least one additive selected from a polymerization initiator, a polymerization promotor and a photosensitizer, and in the range of from several minutes to several hours in the case of a hot-melt adhesive containing no additive. The pressure to be applied through the adherends to the adhesive at the time of curing of the adhesive may be 0.5 g/cm$^2$ or more, preferably 2 g/cm$^2$ or more, more preferably 10 g/cm$^2$ or more. A very high pressure may be applied through the adherends to the adhesive so far as the adherends can stand the pressure. Therefore, the upper limit of the pressure to be applied may vary widely according to the kind or kinds of adherends. The time of pressure application is not critical and varies depending on the kinds of an adhesive and adherends and the like. In general, the time of pressure application may be in the range of from 0.5 second to 15 minutes in the case of a hot-melt adhesive containing at least one additive selected from a polymerization initiator, a polymerization promotor and a photosensitizer, and in the range of from several minutes to several hours in the case of a hot-melt adhesive containing no additive. It is to be noted that the time of pressure application may not always be equal to the heating time. In other words, the application of pressure may be carried out, continuously from the beginning to the end, or in some cases, only for a very short time so far as the pressure is applied while the adhesive is in the molten or tacky state.

The terms "application of pressure" and "pressure application" as used herein are intended to include not only intentional external application of pressure but also spontaneous application of pressure such as due to the weight of the adherend or adhesive itself and due to the internal strain of the adherend or adherends, that is, to include all modes of application of pressure to the surfaces of the adherends to be bonded.

The representative procedures of the method of bonding adherends according to the present invention will be explained in detail as follows.

The hot-melt adhesive of the present invention is applied at a temperature slightly (e.g. about 5° to about 20° C.) higher than the softening point onto the surface of at least one of adherends and the adherends are put into mutual contact through the adhesive interposed therebetween. Then, the resulting assembly is heated at a temperature at which the curing of the adhesive proceeds while applying an appropriate pressure to the assembly until a sufficient bonding strength is obtained.

When both of a polymerization initiator and a polymerization promotor are used as the additives in the hot-melt adhesive, the adhesive exhibits a remarkable air-drying performance. Accordingly, where it is required for the bonding operation that the hot-melt adhesive containing such additives be maintained in the molten state for a long time, it is preferred in order to prevent the gelling or skinning of the adhesive that the molten adhesive be retained in an atmosphere of an inert gas such as nitrogen or in an airtightly closed system.

Where the hot-melt adhesive of the present invention may be used according to ordinary bonding procedures as are adopted for conventional thermoplastic hot-melt adhesives, a known applicator can be conveniently used.

In the case where the hot-melt adhesive of the present invention is in the form of a powder, a chip, a flake, a fiber, a rope, a film or a tape, there may advantageously be adopted such bonding procedures that the hot-melt adhesive in the solid state is put onto an adherend, another adherend is placed on the adhesive either before or after the adhesive is molten, and the adherends are then heated to the curing temperature of the adhesive while applying the pressure to the adherends to effect curing of the adhesive.

The air-drying, self-curing polyester resin constituting the hot-melt adhesive of the present invention or the composition containing the same as the main component may be melt-blended with at least one additive selected from a polymerization initiator, a polymerization promotor and a photosensitizer or the composition containing the same, immediately followed by application of the blend onto at least one of adherends so that a fear of gelling of the adhesive before the application can be eliminated. Thereafter, as described hereinbefore, the adherends are put into mutual contact through the adhesive interposed therebetween and the curing of the adhesive is effected under heat and pressure. The melt-blending just before application of the molten adhesive onto the adherend can be carried out typically by using two of a conventional applicator or modified one or ones thereof. For example, there are provided two separate lines for guiding respectively the component A (the air-drying self-curing unsaturated polyester resin or the composition containing the same) and the component B (the additive or the composition containing the same) which are melt-blended just before application of the same onto the adherend. Where the additive is liquid, the component B may consist of the additive alone which is guided as such through the line. The two separate lines may be provided either in one applicator or in two separate applicators. The two separate lines may be amalgamated near the ends thereof into one line where two kinds of the melts (the component A and the component B) guided through the two separate lines are blended, immediately followed by application of the blended adhesive onto the adherend. The melt-blending may be carried out just after two kinds of the melts are extruded from the nozzles of two separate lines.

Instead of the above-mentioned procedures in which two kinds of the melts are melt-blended just before application of the same onto the adherend, there may be adopted the procedures in which both of the component A and the component B are melt-blended on the adherend so that a problem of the pot life of the hot-melt adhesive of the present invention is not encountered in practicing the method of the present invention. More specifically, both of the component A and the component B are applied onto the surface of the adherend, and then melt-blended with each other, followed by effecting curing of the blended adhesive under heat and pressure. The melt-blending of both of the component A and the component B may be effected either before or after the adherends are put into mutual contact through the adhesive (components A and B) interposed therebetween. Where the melt-blending is to be effected after the adherends are put into mutual contact through the adhesive (components A and B) interposed therebetween, the component A to be applied onto the adherend may preferably be in the form of a powder, a chip, a flake, a fiber, a rope, a film or a tape, and the component B to be applied onto the adherend may preferably be in the form of a liquid, a powder, a chip, a flake, a fiber, a rope, a film or a tape. Where the melt-blending is to be effected before the adherends are put into mutual contact through the adhesive (components A and B) interposed therebetween, the component A in the molten state and the component B in the molten state may preferably be applied from two separate lines therefor onto the adherend. The melt-blending may preferably be effected by pressure applied, while heating, through the adherends to the components A and B constituting the adhesive.

The heating to the curing temperature of the hot-melt adhesive may be carried out utilizing conduction, convection and/or radiation of heat by contacting the adherends having the adhesive therebetween with a heated medium such as a heated iron plate or heated air to effect bonding-curing of the adhesive. Instead, the high-frequency heating may advantageously be carried out in some cases, for example, where only the transmission of heat through the adherends to the adhesive is not enough to heat the adhesive to the curing temperature thereof, for example, in the case of bulky adherends.

Where a photosensitizer is used in the hot-melt adhesive of the present invention, the bonding-curing of the adhesive may advantageously be effected under irradiation of actinic rays. The photocuring of the adhesive can be accomplished at a temperature higher than the softening point of the adhesive under pressure by exposing a layer of the adhesive to actinic rays emitted from a light source such as a mercury lamp, a xenon lamp, a hydrogen discharge lamp or a tungsten lamp which is preferably at 100 W or more. The distance between the light source and the adhesive layer is preferably 50 cm or less, and the time of irradiation of actinic rays is preferably in the range of from several seconds to several tens of minutes. The use of a light source of less than 100 W prolongs the time of curing of the adhesive undesirably because the intensity of light emitted from such a source is low. When the distance between the light source and the adhesive layer is more than 50 cm, the light is disadvantageously wasted to a considerable extent. In the case of photocuring, excessive heating to the heat-curing temperature of the adhesive is not needed if only the adhesive is heated to a temperature higher than the softening point of the adhesive. However, the heat-curing may be effected in combination with the photocuring by heating the adhesive above the heat-curing temperature thereof especially in the case of a hot-melt adhesive having a polymerization initiator incorporated therein in addition to the photosensitizer to further speed up the curing of the adhesive. In the case of a hot-melt adhesive having a photosensitizer but not a polymerization initiator incorporated therein, the gelling of the adhesive in the molten state is hard to occur before effecting the photocuring, and, hence, a long pot life of the adhesive can advantageously be obtained.

The hot-melt adhesive of the present invention provides a sufficient bonding strength and an excellent heat resistance. Further, if at least one additive selected from a polymerization initiator, a polymerization promotor and a photosensitizer is incorporated into the hot-melt adhesive, an extremely rapid curing performance such as cannot be attained with the conventional curing type adhesives can be imparted to the adhesive, and the adhesive can be cured even for 1 minute or less in some cases. Furthermore, the hot-melt adhesive of the present invention is manufactured at a very low cost. When the trend of an adhesive industry is taken into consideration, the hot-melt adhesive of the present invention will be widely used from now on in various fields such as of automobiles and of electric and electronic parts.

The illustrative advantages of the hot-melt adhesive of the present invention are summarized as follows.

1. Because of its being of a curing type, it has such a high heat resistance as cannot be realized by the conventional hot-melt adhesives.

2. It has excellent humidity resistance, solvent resistance, dimensional stability, cold weather resistance and heat shock resistance, as compared with the conventional hot-melt adhesives.

3. It can be used in the state of low viscosity as different from the conventional hot-melt adhesives. Accordingly, it can enter into even small pores, enjoying high wetting characteristics. So, it can be used for bonding of various kinds of materials.

4. The base material of it has excellent mechanical strengths as compared with, for example, an ethylene-vinyl acetate copolymer or atactic polypropylene.

5. Since it can enter into even small pores and is capable of self-curing without generation of gases, bubbles are hardly formed, thus enjoying excellent barrier characteristics and sealing characteristics.

6. As different from the conventional curing adhesives of epoxy, isocyanate or unsaturated polyester type which are used in the form of two-pack, it is of a one-pack type. Accordingly, there can be removed a complicated operation for mixing two different components just before the bonding operation, thus enabling the bonding procedures to be simplified.

7. Since it is of a polyester type, it is excellent in light resistance, weather resistance and durability.

8. Since it contains no vinyl monomers and scarecely contain low boiling point components, it does not generate gases. Therefore, it can advantageously be used without sufferring from bad smell or hazard and without causing environmental pollution. Further, because it is of a polyester type, it can be safely handled without any special care to danger of toxicity.

9. The hot-melt adhesive prepared by incorporating the additive at the time of the preparation of the adhesive has such an excellent instantaneous bonding property that it can be generally bonding-cured in a few minutes. Therefore, the time required for bonding operation is considerably shortened, thereby enabling the bonding working to be automated. Reduction of labor cost can be expected.

10. Since it is solid at room temperature, there is no fear of occurrence of a chemical reaction during storage. It can be stably stored for a time as long as is not expected with the liquid type adhesive.

11. Since it contains no monomer for cross-linking, a long pot life can be enjoyed. The bonding operation can be simply, efficiently conducted without loss of the adhesive material.

12. It can be used even without any additive being incorporated. The cost is reduced, and there can be obtained a long pot life.

13. Since it comprises as the base resin an unsaturated polyester, the raw material is cheap. Further, because kneading operation of incorporating a vinyl monomer is not needed, the production operation can be simplified, leading to reduction of production cost.

14. Since it is solid at room temperature, it can be readily provided in the form of a powder, a chip, a flake, a fiber, a tape, a rope, a film and a bulk, so that it can be easily handled and immediately meet the customer's need.

15. A customary applicator can be used without any change of design thereof.

16. Since it is of a solvent-free type, it can be safely used without fears of environmental pollution, catching of fire and explosion.

17. As different from the conventional unsaturated polyesterbased adhesive, it does not undergo curing inhibition by oxygen in air. Accordingly, it can attain a sufficient bonding-curing performance without any additive being incorporated. Further, with the adhesive in which an additive, particularly a polymerization promotor, is incorporated, the curing speed can be controlled by regulating the quantity of air supplied.

18. Since it is of a polyester type, it has a good electric insulating property and therefore it can be advantageously used in the field of electric apparatuses and equipments.

The present invention will now be described in more detail with reference to the following Examples that by no means limit the scope of the invention.

The properties of polymers and hot-melt adhesives as described herein are determined according to the following methods.

1. AVERAGE POLYMERIZATION DEGREE

The average polymerization degree of a polyester resin is represented by the following equation.

$$\text{Average Polymerization Degree} = \frac{\left[\begin{array}{c}\text{Molar Amount of Polybasic Carboxylic Acid}\\\text{or Hydroxy-carboxylic Acid Component}\\\text{Constituting Polyester}\end{array}\right] \times 2}{\left[\begin{array}{c}\text{Equivalent}\\\text{Amount of}\\\text{Terminal}\\\text{Blocking}\\\text{Groups}\end{array}\right] + \left[\begin{array}{c}\text{Equivalent}\\\text{Amount of}\\\text{Terminal}\\\text{Carboxyl}\\\text{Groups}\end{array}\right] + \left[\begin{array}{c}\text{Equivalent}\\\text{Amount of}\\\text{Terminal}\\\text{Hydroxyl}\\\text{Groups}\end{array}\right]}$$

wherein the "molar amount" and "equivalent amount" are those values for the total polyester formed.

A solution of a polyester resin dissolved in dimethylformamide is subjected to titration with a ½ N solution of sodium hydroxide in methanol under an atmosphere of a nitrogen gas by means of an automatic titration apparatus. The equivalent amount of the terminal carboxyl groups in the polyester is calculated from the concentration of the polyester resin in the solution thereof and the amount of the sodium hydroxide solution consumed for titration.

The equivalent amount of the terminal hydroxyl groups in the polyester is represented by the following equation. Equivalent Amount of Terminal Hyroxyl Groups=[Equivalent Amount of All Hyroxyl Groups after Hydrolysis of Polyester]−[Equivalent Amount of All Carboxylic Groups after Hydrolysis of Polyester]+[Equivalent Amount of Terminal Carboxyl Groups]

The equivalent amount of all the hydroxyl groups after the hydrolysis of the polyester is determined by the gas-chromatographic quantitative analysis of the alcohol component after the hydrolysis of the polyester or calculated from the equivalent amount of the alcohol component involved in the polyester-forming reaction. The latter equivalent amount is calculated by subtracting the equivalent amount of the alcohol component distilled off out of the reaction system from the equivalent amount of the alcohol component charged into the reaction system. The alcohol component also includes a hydroxy-carboxylic acid component. The equivalent amount of all the carboxylic groups after the hydrolysis of the polyester is calculated by subtracting the equivalent amount of the carboxylic acid component having escaped out of the reaction system from the equivalent amount of the carboxylic acid component charged into the reaction system, wherein the carboxylic acid component is intended to include not only a carboxylic acid and a hydroxy-carboxylic acid but also derivatives thereof such as an ester and an acid anhydride. The equivalent amount of the carboxylic acid component having escaped out of the reaction system is usually very small, and, accordingly, can be neglected.

The terminal blocking groups are derived from a terminal blocking agent such as a monobasic carboxylic acid and/or a monohydric alcohol. The equivalent amount of the terminal blocking groups in the polyester is calculated by subtracting the equivalent amount of the terminal blocking agent having escaped out of the reaction system from the terminal blocking agent charged into the reaction system.

The molar amount of the polybasic carboxylic acid or hydroxy-carboxylic acid component constituting the polyester is calculated by subtracting the molar amount of the polybasic carboxylic acid or hydroxy-carboxylic acid component having escaped out of the reaction system from the molar amount of the polybasic carboxylic acid or hydroxy-carboxylic acid component charged into the reaction system. The molar amount of the polybasic carboxylic acid or hydroxy-carboxylic acid component having escaped out of the reaction system is usually very small, and, accordingly, can be neglected.

When the average polymerization degree of the polyester resin is less than 20 as determined according to the above-mentioned procedures, the value obtained represents as such the average polymerization degree in this specification. When the average polymerization degree is 20 or more as determined according to the above-mentioned procedures, the average polymerization degree of the polyester resin is determined according to the following two equations (1) and (2).

$$\text{Average Polymerization Degree} = \frac{[\text{Number Average Molecular Weight}]}{\left[\begin{array}{c}\text{Number Average Value of Molecular Weight}\\\text{of Recurring Unit}\end{array}\right]} \quad (1)$$

$$0.793 \times \eta_{sp}/C + 0.075 = 1.7 \times 10^4 \times \left[\begin{array}{c}\text{Number Average}\\\text{Molecular Weight}\end{array}\right]^{-0.83} \quad (2)$$

wherein C is a polyester concentration of a solution used for measuring "specific viscosity" by an Ostwald viscometer (g/100 ml solvent).

The $\eta_{sp}/C$ value in the equation (2) is determined as follows. 0.5 g of the polyester resin is dissolved in 50 ml of o-chlorophenol as a solvent to form a solution. The time requied for the solution to flow down through the capillary tube of an Ostwald viscometer is divided by the time required for the solvent to flow down through the capillary tube of the same Ostwald viscometer, to obtain a $\eta_{rel.}$ value. The $\eta_{sp}$ value is obtained according to the following equation (3).

$$\eta_{sp} = \eta_{rel.} - 1 \qquad (3)$$

2. SOFTENING POINT

The softening point of a polymer is determined using a differential scanning calorimeter in which the rate of elevation of temperature is set at 16° C./minute. The softening point is defined to indicate a temperature at which the descending line from the peak of the curve in a chart reaches the base line of the chart.

3. TENSILE SHEAR BONDING STRENGTH

Two copper plates having a thickness of 0.3 mm, a length of 100 mm and a width of 100 mm are immersed in trichlene for 2 hours and dried at 60° C. for 1 hour. A hot-melt adhesive is interposed between the two copper plates, which have their respective end portions (10 mm in width) overlapping each other through the hot-melt adhesive. The resulting assembly is heated while applying a pressure thereto to effect bonding of the copper plates with the adhesive.

Three 10 mm×190 mm specimens having a bonded portion in the middle area are prepared by cutting the assembly at its intermediate portion. These specimens are allowed to stand in a thermostat chamber at 20° C. for 24 hours. With respect to each specimen, the tensile shear bonding strength of the adhesive is measured using an Autograph P-100 (trade name of a tensile strength tester manufactured and sold by Shimadzu Seisakusho Ltd., Japan). The unit of tensile shear bonding strength is kg/cm².

4. T-PEEL BONDING STRENGTH

Two copper plates having a thickness of 0.1 mm, a length of 200 mm and a width of 90 mm are immersed in trichlene for 2 hours and dried at 60° C. for 1 hour. A 50 mm×100 mm film of a hot-melt adhesive is interposed partially between the two copper plates which wholly overlap each other. In the above structure, the film of the hot-melt adhesive is located in registry with a 50 mm×100 mm rectangular area which is assumed in one of the half sections of the copper plate partitioned by the central border line extending in parallel with the lateral edge of the copper plate and positioned in the width-wise middle portion of the half section of the copper plate and end to end in the length-wise direction. The resulting assembly is heated with application of pressure by hot-plate pressing to effect bonding of the copper plates with the adhesive. In order that the hot-melt adhesive does not flow out of the assembly at the time of the hot-plate pressing, a spacer may be inserted into the interspacing between the other half portions of the copper plates.

A strip-shaped specimen (10 mm×200 mm) having a bonded portion in the half is prepared by cutting the assembly at its intermediate portion. The specimen is allowed to stand in a thermostat chamber at 20° C. for 24 hours. With respect to the specimen, the T-peel bonding strength of the adhesive is measured using the same tensile strength tester as is used in the test of tensile shear bonding strengh. The T-peel bonding strength is represented by the strength per 25 mm in width (kg 25 mm).

5. CURING SPEED (CURING TIME)

A hot-melt adhesive is applied onto a hot plate heated to a predetermined temperature to form a thin film of the adhesive. The surface of the film of the adhesive is pricked with a wire to check whether or not the surface retains legginess. The time required for the surface of the film to lose legginess completely is measured, and it is defined to be a curing time which is a yardstick of the curing speed of the adhesive.

6. HEAT RESISTANCE

The specimen prepared in the test of tensile shear bonding strength is hung in the electric furnace in which the temperature is maintained at 150° C. The specimen is loaded downwardly by means of a load (tare: 0.5 kg, weight: 3 kg). The heat resistance of the hot-melt adhesive is evaluated as follows.

○: Adhesive failure does not occur under the load of tare and weight.
Δ: Adhesive failure does not occur under the load of tare, but occurs under the load of tare and weight.
X: Adhesive failure occurs under the load of tare alone.

7. OIL RESISTANCE

The specimen prepared in the test of tensile shear bonding strength is immersed in engine oil at 135° C. for 100 hours and is then loaded downwardly by means of a load (tare: 0.5 kg, weight: 3 kg). The oil resistance of the hot-melt adhesive is evaluated as follows.

○: Adhesive failure does not occur under the load of tare and weight.
Δ: Adhesive failure does not occur under the load of tare, but occurs under the load of tare and weight.
X: Adhesive failure occurs under the load of tare alone.

8. BLOCKING

The blocking tendency of a polyester resin is evaluated as follows.

⊙: Blocking does not occur at all.
○: Blocking does not occur but the surface of a resin is slightly slimy.
Δ: Blocking occurs to a small extent.
X: A resin is tacky and blocking occurs.

9. SHORE HARDNESS

The Shore hardness of a polymer is measured according to ASTM D-2240.

10. MELT VISCOSITY

The melt viscosity of a polymer is measured using a Koka Type Flow Tester (trade name of a product manufactured and sold by Shimadzu Seisakusho Ltd., Japan).

In the following Examples, the names of raw materials are abbreviated as follows.

| | |
|---|---|
| DMT: | dimethyl terephthalate |
| DMI: | dimethyl isophthalate |
| ADA: | adipic acid |
| FA: | fumaric acid |
| MA: | maleic acid |
| HA: | 3,6-endomethylene-$\Delta^4$-tetrahydrophthalic anhydride |
| EG: | ethylene glycol |
| PG: | propylene glycol |
| HD: | 1,6-hexanediol |
| PEG: | polyethylene glycol (average number molecular weight = 500) |
| SB: | sorbic acid |
| NBA: | norbornene alcohol |
| DPE: | ethylene glycol-added dicyclopentadiene |
| OA: | oleic acid |
| DIA: | dimer acid |
| THPA: | tetrahydrophthalic anhydride |
| TCPA: | tetrachlorophthalic anhydride |
| LA: | linoleic acid |
| MMD: | dimethyl $\alpha$-methyl $\delta$-methyladipate |
| IA: | itaconic acid |
| HETA: | HET acid (chlorendic acid) |
| AGE: | allyl glycidyl ether |
| PGE: | phenyl glycidyl ether |
| BGE: | butyl glycidyl ether |
| GMAE: | glycerol monoallyl ether |
| THFOL: | tetrahydrofurfuryl alcohol |
| BD: | 1,4-butanediol |
| NPG: | neopentyl glycol |
| DA: | decenoic acid |
| BC: | benzyl cellosolve |
| FOL: | furfuryl alcohol |
| NOL: |  |
| OBOL: | 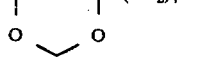 |
| BAA: | benzoylacetic acid |
| DCM: | dicyclopentadiene maleate |
| OOL: | oleic alcohol |
| RA: | ricinoleic acid |

EXAMPLE 1 AND COMPARATIVE EXAMPLE 1

Polyester resins having a composition of raw materials charged as indicated in Table 1 were prepared according to the following procedures.

A 500 ml flask equipped with a distillation pipe, a stirring rod and a nitrogen introducing pipe was charged with a dimethyl ester of a dicarboxylic acid and a glycol, and the ester exchange reaction was carried out in the presence of an ester exchange catalyst between 160° C. and 210° C. under a nitrogen atmosphere to form a bishydroxyalkyl ester of the dicarboxylic acid and an oligomer thereof. Then, other carboxylic acid and an alcohol were added to the reaction system, and the esterification reaction (dehydration reaction) was carried out between 180° C. and 215° C. under atmospheric pressure while introducing a nitrogen gas into the flask until the reaction proceeded to an extent of about 95%. Then, a polycondensation catalyst was added to the reaction system and the polycondensation reaction was carried out between 180° C. and 205° C. under a reduced pressure of 0.05 to 5 mmHg until the viscosity of the reaction mixture was increased to a desired level. After completion of the reaction, the polyester resin obtained was cooled rapidly.

In the cases where ethylene glycol, propylene glycol or neopentyl glycol alone was used as the alcohol component, manganese acetate was used as the ester exchange catalyst in an amount of 0.05% by weight based on the total acid and diantimony trioxide was used as the polycondensation catalyst in an amount of 0.05% by weight based on the total acid. In all other cases, tetraisopropyl titanate was used as the ester exchange catalyst in an amount of 0.05% by weight based on the total acid and additional tetraisopropyl titanate was added as the polycondensation catalyst in an amount of 0.05% by weight based on the total acid.

The properties of the polyester resins formed were as shown in Table 1. In Table 1, the "Comparative" given under "polyester No." indicates Comparative Example, and the other polyester resins are of the present invention.

Every assembly for measuring the T-peel bonding strength of a polyester resin was heated at 250° C. under application of a pressure of 200 g/cm² for 20 minutes.

TABLE 1

| | Polyester No. | | | | | | | |
|---|---|---|---|---|---|---|---|---|
| | 1 | 2 | 3 | 4 | 5 | 6 | 7 | 8 |
| Composition of Raw Materials Charged (Part by weight) | DMT(400) FA(240) HA(335) EG(450) | DMT(665) FA(120) HA(170) BD(700) | DMT(390) FA(175) HA(250) BD(680) | DMT(390) FA(320) OA(7) BD(680) | DMT(390) FA(175) DIA(800) BD(680) | DMT(390) FA(175) THPA(230) BD(680) | DMT(390) FA(175) TCPA(1-30) BD(680) | DMT(390) FA(320) HA(41) BD(720) |
| Properties | | | | | | | | |
| Softening Point (°C.) | 126 | 142 | 94 | 124 | 117 | 104 | 133 | 120 |
| Shore Hardness | 40 | 30 | 17 | 40 | 12 | 28 | 45 | 25 |
| Blocking | Δ | ⊚ | ⊚ | ⊚ | ⊚ | ⊚ | ⊚ | ⊚ |
| Reduced Viscosity ($\eta_{sp}/C$) | 0.256 | 0.296 | 0.253 | 0.247 | 0.284 | 0.271 | 0.295 | 0.250 |
| Melt Viscosity (poise) | 70(150° C.) | 90(180° C.) | 104(100° C.) | 59(120° C.) | 34(120° C.) | 14(120° C.) | 89(140° C.) | 50(120° C.) |
| Curing Time | 12 min(190° C.) 3 min(225° C.) | 8 min(225° C.) | 15 min(200° C.) 5 min(220° C.) | | | | | |
| T-Peel Bonding Strength | 1.20 | 1.93 | 2.12 | 1.65 | 1.55 | 2.97 | 1.23 | 2.99 |
| Heat Resistance | ○ | ○ | ○ | | | | | |

TABLE 1-continued

|  | 9 | 10 | 11 | 12 | 13 | 14 | 15 | 16 |
|---|---|---|---|---|---|---|---|---|
| Composition of Raw Materials Charged (Part by weight) | DMT(390) FA(320) DPE(49) HD(710) | DMT(390) FA(320) HA(250) NPG(640) | DMT(390) FA(320) SB(28) BD(720) | DMT(390) FA(320) LA(70) BD(720) | DMT(390) FA(175) MMD(360) BD(710) | DMT(390) FA(350) AGE(29) BD(700) | DMT(390) FA(175) IA(195) BD(720) | DMT(390) FA(175) HETA(580) BD(720) |
| Properties |  |  |  |  |  |  |  |  |
| Softening Point (°C.) | 89 | 99 | 119 | 119 | 103 | 122 | 112 | 90 |
| Shore Hardness | 15 | 45 | 13 | 20 | 15 | 23 | 15 | 25 |
| Blocking | ⊚ | Δ | ⊚ | ⊚ | ○ | ⊚ | ⊚ | ○ |
| Reduced Viscosity ($\eta_{sp}/C$) | 0.274 | 0.193 | 0.222 | 0.268 | 0.372 | 0.223 | 0.205 | 0.192 |
| Melt Viscosity (poise) | 11 (120° C.) | 10 (120° C.) | 47(120° C.) | 57(120° C.) | 40(120° C.) | 51(130° C.) | 32(120° C.) | 15(120° C. |
| Curing Time |  |  |  |  | 3-4 min(200° C.) 50-60 sec (250° C.) | 7-8 min(200° C.) 1.5-2 min (250° C.) |  |  |
| T-Peel Bonding Strength | 1.47 | 1.18 | 2.13 | 2.04 | 2.00 | 2.04 | 1.80 | 1.35 |
| Heat Resistance |  |  |  |  | ○ | ○ |  |  |

|  | Polyester No. | | | | | | | | |
|---|---|---|---|---|---|---|---|---|---|
|  | 17 | 18 | 19 | 20 | 21 | 22 | 23 | 24 | 25 |
| Composition of Raw Materials Charged (Part by weight) | DMT(390) FA(350) AGE(110) BD(630) | DMT(390) FA(350) PGE(150) BD(630) | DMT(390) FA(350) BGE(130) BD(630) | DMT(390) FA(350) GMAE(130) BD(630) | DMT(390) FA(350) THFOL(26) BD(630) | DMT(390) FA(320) DA(43) BD(720) | DMT(390) FA(320) RA(75) BD(720) | DMT(390) FA(320) OOL(67) BD(700) | DMT(390) FA(175) HA(250) PG(670) |
| Properties |  |  |  |  |  |  |  |  |  |
| Softening Point (°C.) | 107 | 110 | 115 | 115 | 124 | 119 | 117 | 119 | 85 |
| Shore Hardness | 20 | 18 | 25 | 31 | 28 | 25 | 30 | 20 | 45 |
| Blocking | ⊚ | ⊚ | ⊚ | ⊚ | ⊚ | ⊚ | ⊚ | ⊚ | Δ |
| Reduced Viscosity ($\eta_{sp}/C$) | 0.255 | 0.208 | 0.285 | 0.201 | 0.255 | 0.202 | 0.203 | 0.241 | 0.277 |
| Melt Viscosity (poise) | 77(120° C.) | 32(120° C.) | 34(120° C.) | 34(120° C.) | 25(130° C.) | 55(120° C.) | 20(120° C.) | 40(120° C.) | 28(120° C.) |
| Curing Time |  |  |  |  |  |  |  |  |  |
| T-Peel Bonding Strength | 1.85 | 2.00 | 1.70 | 1.01 | 2.05 | 1.56 | 1.68 | 1.56 | 1.04 |
| Heat Resistance |  |  |  |  |  |  |  |  |  |

|  | Polyester No. | | | | | | | |
|---|---|---|---|---|---|---|---|---|
|  | 26 | 27 | 28 | 29 | 30 | 31 Comparative | 32 | 33 |
| Composition of Raw Materials Charged (Part by weight) | DMT(390) FA(350) DPE(49) BD(590) PEG(40) | DMT(390) FA(350) BC(38) BD(630) | DMT(390) FA(350) DPE(10) BD(700) | DMT(390) FA(330) OA(42) BD(720) | DMT(390) FA(340) OA(14) BD(720) | DMT(390) FA(350) BD(720) | DMT(390) FA(340) HA(8) BD(720) | DMT(390) FA(350) FOL(25) BD(700) |
| Properties |  |  |  |  |  |  |  |  |
| Softening Point (°C.) | 118 | 115 | 119 | 119 | 124 | 127 | 125 | 117 |
| Shore Hardness | 28 | 40 | 33 | 28 | 33 | 35 | 32 | 30 |
| Blocking | ⊚ | ⊚ | ⊚ | ⊚ | ⊚ | ⊚ | ⊚ | ⊚ |
| Reduced Viscosity ($\eta_{sp}/C$) | 0.277 | 0.267 | 0.251 | 0.238 | 0.300 | 0.265 | 0.220 | 0.213 |
| Melt Viscosity (poise) | 35(120° C.) | 34(120° C.) | 30(130° C.) | 28(130° C.) | 60(130° C.) | 33(130° C.) | 24(130° C.) | 27(120° C.) |
| Curing Time |  |  |  |  |  |  |  |  |
| T-Peel Bonding Strength | 1.05 | 2.00 | 2.35 | 1.70 | 1.70 | 0.50 | 2.25 | 2.10 |
| Heat Resistance |  |  |  |  |  | X |  |  |

|  | Polyester No. | | | | | | | |
|---|---|---|---|---|---|---|---|---|
|  | 34 | 35 | 36 | 37 | 38 | 39 | 40 | 41 Comparative |
| Composition of Raw Materials Charged (Part by weight) | DMT(390) FA(350) NOL(29) BD(700) | DMT(390) FA(350) OBOL(37) BD(700) | DMT(390) FA(350) BAA(41) BD(700) | DMI(390) FA(350) DPE(10) BD(720) | DMT(776) FA(120) DPE(49) BD(700) | DMT(870) FA(58) DPE(49) BD(760) | DMT(920) FA(29) DPE(49) BD(900) | DMT(460) DMI(270) ADA(180) BD(790) |
| Properties |  |  |  |  |  |  |  |  |
| Softening Point (°C.) | 120 | 121 | 124 | 85 | 150 | 173 | 187 | 130 |
| Shore Hardness | 28 | 31 | 33 | 18 | 38 | 42 | 45 | 38 |
| Blocking | ⊚ | ⊚ | ⊚ | ⊚ | ⊚ | ⊚ | ⊚ | ⊚ |
| Reduced Viscosity ($\eta_{sp}/C$) | 0.257 | 0.202 | 0.215 | 0.197 | 0.253 | 0.267 | 0.289 | 0.358 |
| Melt Viscosity (poise) | 58(130° C.) | 23(130° C.) | 28(130° C.) | 15(100° C.) | 50(200° C.) | 59(200° C.) | 65(200° C.) | 111(140° C.) |

TABLE 1-continued

| Curing Time | | | | | | | | |
|---|---|---|---|---|---|---|---|---|
| T-Peel Bonding Strength | 1.97 | 2.05 | 1.84 | 2.18 | 2.06 | 1.78 | 1.08 | 0.67 |
| Heat Resistance | | | | | | | Δ | X |

| | | Polyester No. | | |
|---|---|---|---|---|
| | | 42 Comparative | 43 | 44 |
| Composition of Raw Materials Charged (Part by weight) | | DCM(149) HA(250) PG(26) | FA(350) HA(250) BD(680) | DMT(390) FA(350) DPE(2) BD(760) |
| Properties | | | | |
| Softening Point (°C.) | | unable to measure | | 125 |
| Shore Hardness | | below 1 | | 35 |
| Blocking | | X | ⊚ | ⊚ |
| Reduced Viscosity ($\eta_{sp}$/C) | | 0.07 | 0.281 | 0.295 |
| Melt Viscosity (poise) | | 3(100° C.) | 60(130° C.) | 70(130° C.) |
| Curing Time | | | | |
| T-Peel Bonding Strength | | 0.05 | 1.58 | 1.85 |
| Heat Resistance | | Δ | | |

EXAMPLE 2 AND COMPARATIVE EXAMPLE 2

With respect to polyester resins prepared in Example 1, the effect of incorporation of a polymerization initiator into a polyester resin was examined to obtain results as shown in Table 2.

With respect to some polyester resins, a polyester resin was blended with a polymerization initiator as indicated in Table 2 by forced blending using a Plasti-Corder (trade name of a product manufactured and sold by Brabender AG, West Germany).

With respect to some polyester resins, a polyester resin was melt-blended with a polymerization initiator as indicated in Table 2.

With respect to some polyester resins, a liquid polymerization initiator was applied onto a film of a polyester resin by brushing.

In Table 2, the "Comparative" given under "Run No." indicates Comparative Example, and the other runs are of the present invention.

Every assembly for measuring the T-peel bonding strength and heat resistance of a hot-melt adhesive was heated at 200° C. under application of a pressure of 200 g/cm² for 15 minutes.

TABLE 2

| Run No. | 1 | 2 | 3 | 4 | 5 |
|---|---|---|---|---|---|
| Polyester No. | 3 | 3 | 3 | 4 | 5 |
| Polymerization Initiator | | | | | |
| Kind | 2,5-dimethyl-2,5-di(t-butylperoxy)hexyne-3 | lauroyl peroxide | 1,1-bis(t-butylperoxy)cyclohexane | 2,5-dimethyl 2,5-di(t-butylperoxy)hexyne-3 | 2,5-dimethyl 2,5-di(t-butylperoxy)hexyne-3 |
| Amount (% by weight) | 1.5 | 1.5 | 1.5 | 1.5 | 1.5 |
| Temperature Giving Half-Life of 1 Minute | 193° C. | 114° C. | 154° C. | 193° C. | 193° C. |
| Blending Conditions | Plasti-Corder 80–90° C. 5 min. | Plasti-Corder 80–90° C. 5 min. | Plasti-Corder 80–90° C. 5 min. | Plasti-Corder 80–90° C. 5 min. | Plasti-Corder 80–90° C. 5 min. |
| Curing Time | 30 min (150° C.) 8–10 sec (200° C.) 1–2 sec (250° C.) | 1–2 sec (150° C.) 1–2 sec (200° C.) | 1 min (150° C.) 1–2 sec (200° C.) | 4–6 sec (200° C.) | 12–15 sec (200° C.) |
| T-Peel Bonding Strength | 2.91 | 2.10 | 2.06 | 1.73 | 1.60 |
| Heat Resistance | ○ | ○ | ○ | ○ | ○ |

| Run No. | 6 | 7 | 8 | 9 | 10 |
|---|---|---|---|---|---|
| Polyester No. | 6 | 7 | 8 | 9 | 10 |
| Polymerization Initiator | | | | | |
| Kind | 2,5-dimethyl-2,5-di(t-butylperoxy)hexyne-3 | 2,5-dimethyl-2,5-di(t-butylperoxy)hexyne-3 | 2,5-dimethyl-2,5-di(t-butylperoxy)hexyne-3 | 2,5-dimethyl-2,5-di(t-butylperoxy)hexyne-3 | 2,5-dimethyl 2,5-di(t-butylperoxy)hexyne-3 |
| Amount (% by weight) | 1.5 | 1.5 | 1.5 | 1.5 | 1.5 |
| Temperature Giving Half-Life of 1 Minute | 193° C. | 193° C. | 193° C. | 193° C. | 193° C. |
| Blending Conditions | melt-blending | Plasti-Corder 120–123° C. | melt-blending | melt-blending | melt-blending |

TABLE 2-continued

| | | | | | |
|---|---|---|---|---|---|
| | | 120° C. | 120° C. | 120° C. | 120° C. |
| | | 5 min | 5 min | 5 min | 5 min |
| Curing Time | 13-15 sec (200° C.) | 10-15 sec (200° C.) | 24-30 sec (200° C.) | 22-30 sec (200° C.) | 17-20 sec (200° C.) |
| T-Peel Bonding Strength | 3.07 | 1.25 | 3.28 | 1.50 | 1.30 |
| Heat Resistance | ○ | ○ | ○ | ○ | Δ |
| Run No. | 11 | 12 | 13 | 14 | 15 |
| Polyester No. | 11 | 12 | 13 | 14 | 15 |
| Polymerization Initiator | | | | | |
| Kind | 2,5-dimethyl-2,5-di(t-butylperoxy)hexyne-3 | 2,5-dimethyl-2,5-di(t-butylperoxy)hexyne-3 | 2,5-dimethyl-2,5-di(t-butylperoxy)hexyne-3 | 2,5-dimethyl-2,5-di(t-butylperoxy)hexyne-3 | 2,5-dimethyl-2,5-di(t-bitulperoxy)hexyne-3 |
| Amount (% by weight) | 1.5 | 1.5 | 1.5 | 1.5 | 1.5 |
| Temperature Giving Half-Life of 1 Minute | 193° C. | 193° C. | 193° C. | 193° C. | 193° C. |
| Blending Conditions | melt-blending 120° C. 5 min | melt-blending 120° C. 5 min | melt-blending 120° C. 5 min | melt-blending 120° C. 5 min | melt-blending 120° C. 5 min |
| Curing Time | 15-22 sec (200° C.) | 15-20 sec (200° C.) | 3-5 sec (200° C.) | 3-5 sec (200° C.) | 24-30 sec (200° C.) |
| T-Peel Bonding Strength | 2.23 | 2.14 | 1.95 | 2.42 | 1.89 |
| Heat Resistance | ○ | ○ | ○ | ○ | ○ |
| Run No. | 16 | 17 | 18 | 19 | 20 |
| Polyester No. | 16 | 17 | 18 | 19 | 20 |
| Polymerization Initiator | | | | | |
| Kind | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 |
| Amount (% by weight) | 1.5 | 1.5 | 1.5 | 1.5 | 1.5 |
| Temperature Giving Half-Life of 1 Minute | 193° C. | 193° C. | 193° C. | 193° C. | 193° C. |
| Blending Conditions | melt-blending 120° C. 5 min | melt-blending 120° C. 5 min | melt-blending 120° C. 5 min | melt-blending 120° C. 5 min | melt-blending 120° C. 5 min |
| Curing Time | 8-10 sec (200° C.) | 3-5 sec (200° C.) | 11-14 sec (200° C.) | 2-4 sec (200° C.) | 2-4 sec (200° C.) |
| T-Peel Bonding Strength | 1.40 | 1.89 | 2.04 | 1.81 | 1.11 |
| Heat Resistance | ○ | ○ | ○ | ○ | ○ |
| Run No. | 21 | 22 | 23 | 24 | 25 |
| Polyester No. | 21 | 22 | 23 | 24 | 25 |
| Polymerization Initiator | | | | | |
| Kind | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 |
| Amount (% by weight) | 1.5 | 1.5 | 1.5 | 1.5 | 1.5 |
| Temperature Giving Half-Life of 1 Minute | 193° C. | 193° C. | 193° C. | 193° C. | 193° C. |
| Blending Conditions | melt-blending 120° C. 5 min | melt-blending 120° C. 5 min | melt-blending 120-130° C. 5 min | melt-blending 120-130° C. 5 min | melt-blending 120-130° C. 5 min |
| Curing Time | 2-4 sec (200° C.) | 7-10 sec (200° C.) | 3-5 sec (200° C.) | 5-7 sec (200° C.) | 15-18 sec (200° C.) |
| T-Peel Bonding Strength | 2.05 | 1.57 | 1.75 | 1.65 | 1.05 |
| Heat Resistance | ○ | ○ | ○ | ○ | Δ |
| Run No | 26 | 27 | 28 | 29 | 30 |
| Polyester No. | 26 | 27 | 28 | 29 | 30 |
| Polymerization Initiator | | | | | |
| Kind | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 |
| Amount (% by weight) | 1.5 | 1.5 | 1.5 | 1.5 | 1.5 |
| Temperature Giving Half-Life of 1 MInute | 193° C. | 193° C. | 193° C. | 193° C. | 193° C. |

TABLE 2-continued

| Blending Conditions | melt-blending 120–130° C. 5 min | melt-blending 120–130° C. 5 min | melt-blending 120–130° C. 5 min | melt-blending 120–130° C. 5 min | melt-blending 120–130° C. 5 min |
|---|---|---|---|---|---|
| Curing Time | 7–10 sec (200° C.) | 3–5 sec (200° C.) | 5–7 sec (200° C.) | 7–10 sec (200° C.) | 10–15 sec (200° C.) |
| T-Peel Bonding Strength | 1.22 | 2.07 | 2.43 | 1.71 | 1.75 |
| Heat Resistance | ○ | ○ | Δ~○ | ○ | Δ~○ |

| Run No. | 31 Comparative | 32 | 33 | 34 | 35 |
|---|---|---|---|---|---|
| Polyester No. | 31 | 32 | 33 | 34 | 35 |
| Polymerization Initiator | | | | | |
| Kind | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 |
| Amount (% by weight) | 1.5 | 1.5 | 1.5 | 1.5 | 1.5 |
| Temperature Giving Half-Life of 1 Minute | 193° C. | 193° C. | 193° C. | 193° C. | 193° C. |
| Blending Conditions | melt-blending 120–130° C 5 min | melt-blending 120–130° C. 5 min | Plasti-Corder 90–100° C. 5 min | Plasti-Corder 90–100° C. 5 min | Plasti-Corder 90–100° C. 5 min |
| Curing Time | 10–15 sec (200° C.) jellied | 5–7 sec (200° C.) | 5–7 sec (200° C.) | 3–5 sec (200° C.) | 10–15 sec (200° C.) |
| T-Peel Bonding Strength | 0.53 | 2.28 | 2.16 | 2.00 | 2.22 |
| Heat Resistance | X | Δ | ○ | ○ | ○ |

| Run No. | 36 | 37 | 38 | 39 | 40 |
|---|---|---|---|---|---|
| Polyester No. | 36 | 37 | 38 | 39 | 40 |
| Polymerization Initiator | | | | | |
| Kind | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 |
| Amount (% by weight) | 1.5 | 1.5 | 1.5 | 1.5 | 1.5 |
| Temperature Giving Hlaf-Life of 1 Minute | 193° C. | 193° C. | 193° C. | 193° C. | 193° C. |
| Blending Conditions | Plasti-Corder 90–100° C. 5 min | Plasti-Corder 90–100° C. 5 min | application of initiator onto polyester film 5 min | application of initiator onto polyester film 5 min | application of initiator onto polyester film 5 min |
| Curing Time | 15–20 sec (200° C.) | 10–15 sec (200° C.) | 10–15 sec (200° C.) | 20–25 sec (200° C.) | 30 sec (200° C.) |
| T-Peel Bonding Strength | 1.84 | 2.18 | 2.05 | 1.84 | 1.06 |
| Heat Resistance | ○ | Δ~○ | ○ | ○ | Δ |

| Run No. | 41 | 42 | 43 Comparative | 44 |
|---|---|---|---|---|
| Polyester No. | 1 | 2 | 42 | 44 |
| Polymerization Initiator | | | | |
| Kind | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 | 2,5-dimethyl 2,5-di(t-butylperoxy)hexyne-3 |
| Amount (% by weight) | 1.5 | 1.5 | 1.5 | 1.5 |
| Temperature Giving | 193° C. | 193° C. | 193° C. | 193° C. |
| Blending Conditions | Plasti-Corder 60° C. 5 min | Plasti-Corder 120–130° C. 5 min | Plasti-Corder 80° C. 5 min | Plasti-Corder 90° C. 7 min |
| Curing Time | 2–3 sec (200° C.) | 5–10 sec (200° C.) | 2.5–3 min (200° C.) | 30–40 sec (200° C.) |
| T-Peel Bonding Strength | 1.05 | 2.14 | 0.08 | 1.20 |
| Heat Resistance | ○ | ○ | Δ | Δ |

EXAMPLE 3

With respect three kinds of polyester resins prepared in Example 1, the effect of incorporation of a polymerization promotor or a polymerization promotor and a polymerization initiator into a polyester resin was examined to obtain results as shown in Table 3.

A polyester resin was blended with a polymerization promotor as indicated in Table 3. On the other hand, a polyester resin was blended with a polymerization promotor as indicated in Table 3 and 2,5-dimethyl-2,5- di(t-butylperoxy)hexyne-3(polymerization initiator). The blending was effected by forced blending using the same Plasti-Corder as used in Example 2.

Every assembly for measuring the T-peel bonding strength of a hot-melt adhesive was heated at 200° C. under application of a pressure of 200 g/cm² for 15 minutes.

EXAMPLE 5 AND COMPARATIVE EXAMPLE 3

With respect to the same hot-melt adhesive as used in Run. No. 1 of Example 2, the effect of incorporation of a termoplastic polymer to the adhesive was examined to obtain results as shown in Table 5.

The same hot-melt adhesive as used in Run No. 1 of

TABLE 3

| Run No. | 1 | 2 | 3 | 4 | 5 | 6 |
|---|---|---|---|---|---|---|
| Polyester No. | 1 | 1 | 2 | 2 | 3 | 3 |
| Promoter |  |  |  |  |  |  |
| Kind | manganese naphthenate | " | " | " | lead naphthenate | manganese naphthenate |
| Amount (% by weight) | 0.042 (as Mn) | " | " | " | 0.02 (as Pb) | 0.02 (as Mn) |
| Amount of Initiator (% by weight) | none | 1.0 | none | 1.5 | none | none |
| Blending conditions | 40–65° C. 11 min | " | 80–95° C. 13 min | " | 70–80° C. 5 min | " |
| Curing Time |  |  |  |  |  |  |
| Surface Portion | 3.5 min (150° C.) 2–3 sec (210° C.) | 2 min (150° C.) | 7–9 min (150° C.) 2–5 sec (205° C.) | 4–5 min (150° C.) 2–5 sec (200° C.) | 10–15 sec (200° C.) | 8–10 sec (200° C.) |
| Internal Portion | 4.5 sec (150° C.) 20–30 sec (210° C.) | 3–4 min (150° C.) 5 sec (200° C.) | 60 sec (205° C.) | 20 sec (200° C.) | 50–60 sec (200° C.) | 30–40 sec (200° C.) |
| T-Peel Bonding Strength | 1.05 | 1.08 | 2.05 | 2.12 | 1.82 | 2.04 |

EXAMPLE 4

With respect to the same hot-melt adhesive as used in Run No. 1 of Example 2, the relationship between a pressure applied through a copper plate (adherend) to the adhesive and the T-peel bonding strength of the adhesive was examined to obtain results as shown in Table 4.

Every assembly for measuring the T-peel bonding strength of a hot-melt adhesive was heated at 200° C. for 15 minutes.

Example 2 was blended with a thermoplastic polymer as indicated in Table 5 by forced blending using the same Plasti-Corder as used in Example 2.

For comparison, Thermogrip-324 (trade name of a hot-melt adhesive manufactured and sold by Bostik GMBH, West Germany) was also examined.

Every assembly for measuring the tensile shear bonding strength, the T-peel bonding strength and heat resistance of a hot-melt adhesive was heated at 200° C. under application of a pressure of 200 g/cm² for 15 minutes.

TABLE 5

| Run No. | 1 | 2 | 3 | 4 | Comparative 5 | 6 | 7 |
|---|---|---|---|---|---|---|---|
| Thermoplastic |  |  |  |  |  |  |  |
| Kind | Polyester No. 41 in Table 1 | 2 | 3 | 4 | Thermogrip | 6 | 7 |
| Amount (% by weight based on tested adhesive) | 90 | 80 | 67 | 50 | 100 | 90 | 80 |
| Concentration of Double Bond (eq/100 g tested adhesive) | 0.03 | 0.06 | 0.10 | 0.14 | none | 0.03 | 0.06 |
| Blending Conditions | 110–120° C. 5 min | " | " | " |  | 80–90° C. 5 min | " |
| Curing Time | 30 sec (200° C.) | 50–60 sec (200° C.) | 30–40 sec (200° C.) | 4–5 sec (200° C.) |  | 30 sec (200° C.) |  |
| Tensile Shear Bonding Strength | 34.5 | 38.1 | 41.9 | 42.6 | 12.8 | 14.5 | 23.7 |
| T-Peel Bonding Strength | 0.90 | 2.39 | 2.83 | 2.90 | 0.28 | 0.67 | 1.89 |
| Heat Resistance | Δ | ○ | ○ | ○ | X | Δ | ○ |

Note
Thermoplastic polymer, eq: equivalent for 15 minutes.

TABLE 4

| Run No. | 1 | 2 | 3 | 4 | 5 | 6 | 7 |
|---|---|---|---|---|---|---|---|
| Pressure (g/cm²) | 0.5 | 1.5 | 5.0 | 10 | 20 | 60 | 100 |
| T-Peel Bonding Strength | 0.95 | 1.67 | 1.89 | 2.03 | 2.12 | 2.08 | 2.09 |

EXAMPLE 6

With respect to Polyesters Nos. 1 and 3 prepared in Example 1, the melt stability (pot life) was examined to obtain results as shown in Table 6. Also with respect to the case where a polymerization initiator and/or a polymerization promotor was incorporated into a polyester resin, the melt stability was examined to obtain results as shown in Table 6.

A polyester resin was blended with a polymerization initiator and/or a polymerization promotor as indicated in Table 6 by forced blending using the same Plasti-Corder as used in Example 2.

form an assembly having alternating layers. Two sets of such an assembly were prepared.

One assembly was interposed between two pole plates of a high-frequency generator (40.68 MHz, 3

TABLE 6

| Run No. | Polyester No. | Additive (% by weight) | Melt Stability (Pot Life) 100° C. | Melt Stability (Pot Life) 150° C. |
|---|---|---|---|---|
| 1 | 1 | none | more than 24 hr | more than 8 hr |
| 2 | 1 | manganese naphthenate (0.5%) | skinning after 3.5 hr | skinning after 3.5–4.5 min |
| 3 | 1 | manganese naphthenate (0.5%) + 2,5-dimethyl-2,5-di(t-butylperoxy)hexyne-3 (1%) | skinning after 2 hr | skinning after 2 min curing after 3–4 min |
| 4 | 3 | none | more than 24 hr | more than 8 hr |
| 5 | 3 | 2,5-dimethyl-2,5-di(t-butylperoxy)hexyne-3 (1.5%) | more than 24 hr | skinning after 29 min curing after 32–33 min |
| 6 | 3 | 2,5-dimethyl-2,5-di(t-butylperoxy)hexyne-3 (1.5%) + manganese naphthenate (0.5%) | skinning after 2.5 hr | skinning after 7 min curing after 8–9 min |
| 7 | 3 | lauroyl peroxide (1.5%) | gelling just after melting | |
| 8 | 3 | 1,1-bis(t-butylperoxy) cyclohexane (1.5%) | more than 8 hr | skinning after 20–30 sec curing after 1–1.5 sec |

EXAMPLE 4 AND COMPARATIVE EXAMPLE 4

Polyester resins having a varied average polymerization degree were prepared from 390 parts by weight of DMT, 175 parts by weight of FA, 250 parts by weight of HA and BD in a varied amount as indicated in Table 7 in substantially the same manner as described in Example 1 except that the polycondensation catalyst was not added to the reaction system and the polycondensation reaction under reduced pressure was not effected.

Each polyester resin was blended with 1.5% by weight, based on the resin, of 2,5-dimethyl-2,5-di(t-butylperoxy)hexyne-3(polymerization initiator) at a jacket temperature of 50° C. by forced blending using the same Plasti-Corder as used in Example 2.

Every assembly for measuring the T-peel bonding strength of a hot-melt adhesive was heated at 200° C. under application of a pressure of 200 g/cm² for 15 minutes.

KW) and the high-frequency heating was effected with application of a pressure of 1 Kg/cm² for 30 seconds. All pieces of the adhesive were cured and all sheets of the paper were sufficiently bonded. Even when the assembly was allowed to stand in air heated at 150° C., the paper sheets could not be peeled.

The other assembly was interposed between two hot plates heated at 200° C. and was allowed to stand with application of a pressure of 1 Kg/cm² for 10 minutes. However, the middle adhesive layers of the assembly were not cured. When the assembly was allowed to stand in air heated at 150° C., the paper sheets could be easily peeled.

EXAMPLE 9 AND COMPARATIVE EXAMPLE 5

Various methods of incorporation of a polymerization initiator and a polymerization promotor into Polyester No. 3 were compared with each other with respect to tensile shear bonding strength, heat resistance

TABLE 7

| Polyester No. | 45 | 46 | 47 | 48 | 49 |
|---|---|---|---|---|---|
| Amount of BD (part by weight) | 550 | 530 | 510 | 500 | 485 |
| Average Polymerization degree | 6 | 9 | 12 | 15 | 30 |
| Properties of Polyester | | | | | |
| Softening Point | unable to measure tacky | 77 | 84 | 94 | 106 |
| Blocking | X | O | O | O | O |
| Curing Time | 30 sec (200° C.) | 15–20 sec (200° C.) | 10–15 sec (200° C.) | 10–12 sec (200° C.) | 8–10 sec (200° C.) |
| T-Peel Bonding Strength | 1.00 | 1.54 | 2.12 | 2.62 | 2.69 |

EXAMPLE 8

The same hot-melt adhesive prepared in Run No. 1 of Example 2 was formed into a 0.2 mm-thick film by using an applicator. The film was cut to obtain 38 pieces of a 1 cm×5 cm adhesive sample.

19 Pieces of the adhesive sample were interposed between respective adjacent pairs of 20 pieces of a thick air filter paper (2 cm×5 cm) at the respective portions thereof with respect to their width-wise direction to and oil resistance. For comparison, Polyester No. 41 was also tested.

A saturated polyester resin (Polyester No. 50) was prepared from 60 parts by weight of dimethyl terephthalate, 40 parts by weight of adipic acid and 85 parts by weight of ethylene glycol in substantially the same manner as described in Example 1 except that the polycondensation reaction was carried out between 220° C. and 240° C. Polyester No. 50 had a reduced viscosity ($\eta_{sp}/C$) of 0.5.

RUN NO. 1

Polyester No. 50 was blended with 10% by weight, based on the polyester, of dicumyl peroxide and 2% by weight (as manganese), based on the polyester, of manganese naphthenate at 100° C. for 5 minutes by forced blending using the same Plasti-Corder as used in Example 2 to form an additive composition.

The additive composition and Polyester No. 3 [1:10 (part by weight)] was two-layer-wise melt-applied using separate applicators therefor onto a copper plate as prepared in the same manner as in term 3 entitled "Tensile Shear Bonding Strength" appearing on page 51 of this specification and another copper plate as mentioned above was placed thereon.

RUN NO. 2

Dicumyl peroxide and manganese naphthenate were thinly applied by brushing onto a copper plate as mentioned in Run No. 1 above, Polyester No. 3 was applied thereon using an applicator and another copper plate as mentioned above was placed thereon.

RUN NO. 3

The same additive composition as prepared in Run No. 1 above was pulverized to form an additive composition powder (softening point: 135° C.). 1 Part by weight of the additive composition powder was dispersed in 10 parts by weight of Polyester No. 3 molten at 90° C. Polyester No. 3 having the powder dispersed therein was applied using an applicator onto a copper plate as mentioned in Run No. 1 above at 90° C. and another copper plate was mentioned above was placed thereon.

RUN NO. 4

A powder of Polyester No. 3 was mixed with 1% by weight, based on the polyester, of dicumyl peroxide and 0.1% by weight (as manganese), based on the polyester, of manganese naphthenate to form an adhesive composition. The adhesive composition was applied by scattering onto a copper plate as mentioned in Run No. 1 above at room temperature and another copper plate as mentioned above was placed thereon.

RUN NO. 5

Using Polyester No. 41, an assembly for test was prepared in the same manner as described in item 3 entitled "Tensile Shear Bonding Strength" appearing on page 51 of this specification.

Every assembly for measuring the tensile shear bonding strength, heat resistance and oil resistance of a hot-melt adhesive was heated using hot plates at 200° C. under application of a pressure of 200 g/cm² for 5 minutes.

Test results were as shown in Table 8.

TABLE 8

| Run No. | 1 | 2 | 3 | 4 | Comparative 5 |
|---|---|---|---|---|---|
| Tensile Shear Bonding Strength | 28 | 25 | 27 | 29 | 29 |
| Heat Resistance | ◯ | ◯ | ◯ | ◯ | X |
| Oil Resistance | ◯ | ◯ | ◯ | ◯ | X |

EXAMPLE 10

With respect to Polyesters Nos. 1 and 2, the effect of incorporation of a photosensitive into a polyester resin was examined to obtain results as shown in Table 9 (note the Time of Irradiation as a yardstick of curing speed).

A polyester resin was blended with a photosensitizer as indicated in Table 9 by forced blending using the same Plasti-Corder as used in Example 2. On the other hand, a polyester resin was blended with a photosensitizer and a polymerization promotor by forced blending as mentioned above.

The resulting hot-melt adhesive was melt-applied onto a copper plate, and irradiated at a distance of 30 cm with actinic rays emitted from a 3 KW mercury lamp.

TABLE 9

| Run No. | 1 | 2 | 3 |
|---|---|---|---|
| Polyester No. | 1 | 1 | 2 |
| Photosensitizer | dibenzothiazolyl disulfide (1%) | benzoin (1%) | tetramethylthiuram disulfide (1%) |
| (% by weight) | | | |
| Promotor (% by weight) | manganese naphthenate (0.03% as Mn) | none | none |
| Blending Condition | 50° C. 10 min | 50° C. 10 min | 90° C. 10 min |
| Irradiation Condition | | | |
| Time of Irradiation | 2 min | 5 min | 3 min |
| Temperature of Adhesive | 130° C. | 130° C. | 150° C. |
| Curing | cured | cured | cured |

EXAMPLE 11

An air-drying, self-curing unsaturated polyester resin as indicated in Table 10 and a saturated polyester as indicated in Table 10 (said saturated polyester containing 10% by weight and 5% by weight, based on the saturated polyester, of a polymerization initiator and a polymerization promotor as are indicated in the same Table, respectively; only in Run No. 3, no promotor was used) were extruded, at 170° C., through a customary extruder provided with a composite type spinneret at an extrusion ratio (unsaturated polyester:saturated polyester=10:1 by weight) to form a rope-type composite hot-melt adhesive structure having a diameter of about 5 mm which structure was of a form as indicated in Table 10.

The thus obtained rope-type composite hot-melt adhesive structure was applied onto a copper plate as prepared in the same manner as in item 3 entitled "Tensile Shear Bonding Strength" appearing on page 51 of this specification by means of a rope-shaped hot-melt adhesive applicator for a shoe-maker (at a nozzle temperature of 160° C.), and another copper plate as mentioned above was put thereon.

Every assembly for measuring the tensile shear bonding strength, heat resistance and oil resistance of a hot-melt adhesive was heated at 200° C. under application of a pressure of 200 g/cm² for 15 minutes.

TABLE 10

| Run No. | 1 | 2 | 3 | 4 |
|---|---|---|---|---|
| Self-Curing Polyester No. | 2 | 2 | 3 | 3 |
| Saturated Polyester No. | 50 | 50 | 50 | 41 |
| Initiator | dicumyl peroxide | " | t-butyl peroxide | " |
| Promotor | manganese | " | none | N—dimethyl- |

TABLE 10-continued

| Run No. | 1 | 2 | 3 | 4 |
|---|---|---|---|---|
| | naphthenate (5% as Mn) | | | aniline |
| Form | core-in-sheath | islands-in-sea | laminate | core-in-sheath |
| Tensile Shear Bonding Strength | 30 | 31 | 34 | 33 |
| Heat Resistance | ○ | ○ | ○ | ○ |
| Oil Resistance | ○ | ○ | ○ | ○ |

EXAMPLE 12

Polyester No. 2 was pulverized and placed on a wire net of 400 mesh (Tyler). The further polycondensation reactions of the polyester resin were carried out at 190° C. under a reduced pressure of 0.05 mmHg for 8 hours, 12 hours, 19 hours and 25 hours, respectively, to obtain the corresponding polyester resins (Polyesters Nos. 51, 52, 53 and 54, respectively).

The properties of the polyester resins thus obtained were examined to obtain results as shown in Table 11.

Every assembly for measuring the T-peel bonding strength of a polyester resin was heated at 250° C. under application of a pressure of 200 g/cm² for 20 minutes.

TABLE 11

| Polyester No. | 51 | 52 | 53 | 54 |
|---|---|---|---|---|
| Melt Viscosity (poise, 200° C.) | 820 | 950 | 1310 | 1750 |
| Application by Applicator | clogging does not occur at nozzle of applicator at 200° C.; capable of being applied at 200° C. | " | clogging does not occur at nozzle of applicator at 250° C.; capable of being applied at 250° C. | " |
| T-Peel Bonding Strength | 2.00 | 2.10 | 2.15 | 2.30 |

EXAMPLE 13

The same hot-melt adhesive as used in Run No. 1 of Example 2 was blended with a thermoplastic polymer as described below at 110°–120° C. for 5 minutes by forced blending using the same Plasti-Corder as used in Example 2.

Polyester No. 55 (softening point = 132° C., $\eta_{sp}/C = 0.30$)

The polyester resin was prepared from 470 parts by weight of DMT, 280 parts by weight of DMI, 250 parts by weight of ADA and 1,000 parts by weight of BD in the same manner as described in Example 1.

Polyester No. 56 (softening point = 128° C., $\eta_{sp}/C = 0.40$)

The polyester resin was prepared from 460 parts by weight of DMT, 360 parts by weight of ADA and 900 parts by weight of EG in the same manner as described in Example 1.

Nylon No. 1 (softening point = 110° C.)
A copolymer of nylon 6 and nylon 6/12.

Nylon No. 2 (softening point = 135° C.)
A copolymer of nylon 6 and nylon 6T.

The properties of the resulting hot-melt adhesives were as shown in Table 12.

Every assembly for measuring the tensile shear bonding strength, T-peel bonding strength and heat resistance of a hot-melt adhesive was heated at 200° C. under application of a pressure of 200 g/cm² for 15 minutes.

TABLE 12

| Run No. | 1 | 2 | 3 | 4 |
|---|---|---|---|---|
| Thermoplastic | | | | |
| Kind | Polyester No. 55 | Polyester No. 56 | Nylon No. 1 | Nylon No. 2 |
| Amount (% by weight based on tested adhesive | 50 | 40 | 50 | 50 |
| Curing Time | 5–7 sec (200° C.) | 3–6 sec (200° C.) | 12–18 sec (200° C.) | 15–20 sec (200° C.) |
| Tensile Shear Bonding Strength | 38.2 | 35.0 | 25.1 | 24.1 |
| T-Peel Bonding Strength | 2.8 | 2.7 | 1.2 | 1.4 |
| Heat Resistance | ○ | ○ | △ | ○ |

Note
Thermoplastic: thermoplastic polymer

What is claimed is:

1. A hot-melt adhesive comprising: a self-curing unsaturated polyester resin having a softening point of 45° to 200° C., one or more air-drying functional groups, an average polymerization degree of 8 or more and one or more double bonds originating from an α,β-unsaturated dicarboxylic acid; and a thermoplastic saturated polyester resin, said adhesive being capable of performing bonding-curing under heat and pressure, and wherein a vinyl monomer is not contained.

2. A hot-melt adhesive as claimed in claim 1, wherein said one or more air-drying functional groups are present in the self-curing unsaturated polyester resin at a concentration of 0.001 or more equivalent/100 g of the hot-melt adhesive.

3. A hot-melt adhesive as claimed in claim 1, wherein said self-curing unsaturated polyester resin has a double bond concentration of 0.05 or more equivalent/100 g of the hot-melt adhesive.

4. A hot-melt adhesive as claimed in claim 1, wherein said self-curing unsaturated polyester resin has an average polymerization degree of 12 or more.

5. A hot-melt adhesive as claimed in claim 1, wherein said one or more air-drying functional groups are one or more members selected from the group consisting of unsaturated aliphatic groups, saturated alicyclic groups, unsaturated alicyclic groups, saturated heterocyclic groups, unsaturated heterocyclic groups and groups having active methylene or active methine.

6. A hot-melt adhesive as claimed in claim 1, wherein said one or more air-drying functional groups are one or more members selected from the group consisting of a pendant vinylidene group, a pendant vinyl group, a pendant allyl group, unsaturated aliphatic groups having 6 to 20 carbon atoms, groups having a norbornane ring, a tricyclodecane ring, a pentacyclopentadecane ring, a cyclopropene ring, a norbornene ring, a tricyclodecene ring, a pentacyclopentadecene ring, a cyclohexene ring, a tetrahydrofuran ring, a five-membered acetal ring or a furan ring, a benzyl ether group, an allyl ether group, a benzoylacetate group and a glycidyl ether residue.

7. A hot-melt adhesive as claimed in claim 1, wherein said one or more air-drying functional groups are one or more members selected from the group consisting of a pendant vinylidene group, a pendant vinyl group and a pendant allyl group.

8. A hot-melt adhesive as claimed in claim 1, wherein said one or more air-drying functional groups are one or more members selected from unsaturated aliphatic groups having 6 to 20 carbon atoms.

9. A hot-melt adhesive as claimed in claim 1, wherein said one or more air-drying functional groups are one or more members selected from groups having a norbornane ring, a tricyclodecane ring or a pentacyclopentadecane ring and substituted groups thereof.

10. A hot-melt adhesive as claimed in claim 1, wherein said one or more air-drying functional groups are one or more members selected from groups having a norbornene ring, a tricyclodecene ring, a pentacyclopentadecene ring or a cyclohexene ring and substituted groups thereof.

11. A hot-melt adhesive as claimed in claim 1, wherein said one or more air-drying functional groups are one or more members selected from groups having a tetrahydrofuran ring or a five-membered acetal ring and substituted groups thereof.

12. A hot-melt adhesive as claimed in claim 1, wherein said one or more air-drying functional groups are one or more members selected from groups having a furan ring and substituted groups thereof.

13. A hot-melt adhesive as claimed in claim 5, wherein said groups having active methylene or active methine are one or more members selected from the group consisting of a benzyl ether group, an allyl ether group, a benzoylacetate group, a glycidyl ether residue and a 1,4-pentadienylene group, and substituted groups thereof.

14. A hot-melt adhesive as claimed in claim 1, wherein said self-curing unsaturated polyester resin has alcohol component residues comprising saturated straight-chain aliphatic glycol residues having 4 to 10 carbon atoms.

15. A hot-melt adhesive as claimed in claim 1, which further comprises at least one additive selected from the group consisting of a polymerization initiator selected from hydrogen peroxide, persulfates, dialkyl peroxides, diaralkyl peroxides, alkyl aralkyl peroxides, alkyl aryl peroxides, diacyl peroxides, ester peroxides, hydroperoxides, ketal peroxides, peroxycarbonates, metallic peroxide compounds, azo compounds, 2,5-dimethyl-2,5-di(t-butylperoxy)hexyne-3 and 1,1-bis(t-butylperoxy)cyclohexane; a polymerization promoter selected from metallic soaps, metal chelate compounds, amine compounds, phosphorus-containing compounds and sulfur-containing compounds; and a photosensitizer selected from peroxides, azo compounds, sulfides and benzoyl group-containing compounds.

16. A hot-melt adhesive as claimed in claim 15, wherein said polymerization initiator has a half-life of 1 minute or more as measured at 120° C.

17. A hot-melt adhesive as claimed in claim 15, wherein said polymerization promotor is at least one member selected from metallic soaps.

18. A hot melt-adhesive which comprises: a self-curing unsaturated polyester resin having a softening point of 45° to 200° C., one or more air-drying functional groups, an average polymerization degree of 8 or more and one or more double bonds originating from α,β-unsaturated dicarboxylic acid; and at least one additive selected from the group consisting of a polymerization initiator selected from hydrogen peroxide, persulfates, dialkyl peroxides, diaralkyl peroxides, alkyl aralkyl peroxides, alkyl aryl peroxides, diacyl peroxides, ester peroxides, hydroperoxides, ketal peroxides, peroxycarbonates, metallic peroxide compounds, azo compounds, 2,5-dimethyl-2,5-di(t-butylperoxy)hexyne-3 and 1,1-bis(t-butylperoxy)cyclohexane; a polymerization promoter selected from metallic soaps, metal chelate compounds, amine compounds, phosphorus-containing compounds and sulfur-containing compounds; and a photosensitizer selected from peroxides, azo compounds, sulfides and benzoyl group-containing compounds, and wherein said self-curing unsaturated polyester resin is present in the form of the resin itself or a composition containing the resin and said additive is present in the form of the additive itself or a composition containing the additive, said resin or said composition containing the resin being adapted to cooperate with said additive or said composition containing the additive to form a blend, and wherein a vinyl monomer is not contained.

19. A hot-melt adhesive as claimed in claim 15, wherein (1) said self-curing unsaturated polyester resin is present in the form of the resin itself or a composition containing the resin and said resin or said composition containing the resin is a powder, a chip, a flake, a fiber, a rope, a film or a tape; and (2) said at least one additive is present in the form of the additive itself or a composition containing the additive and said additive or said composition containing the additive is a powder, a chip, a flake, a fiber, a rope, a film or a tape.

20. A hot melt adhesive as claimed in claim 15, wherein said self-curing unsaturated polyester resin is present in the form of the resin itself or a composition containing the resin and said additive is present in the form of the additive itself or a composition containing the additive and wherein said resin or said composition containing the resin and said additive or said composition containing the additive are in the form of a composite structure selected from a laminate, a core-in-sheath and an islands-in-sea.

21. A method of bonding adherends, which comprises: applying, onto the surface of at least one of a plurality of adherends having their respective surfaces to be bonded, a hot melt adhesive comprising a self-curing unsaturated polyester resin having a softening point of 45° to 200° C., one or more air-drying functional groups, an average polymerization degree of 8 or more and one or more double bonds originating from an α,β-unsaturated dicarboxylic acid, said adhesive being capable of performing bonding-curing under heat and pressure; and effecting curing of the adhesive under heat and pressure while said plurality of adherends are mutually in association, through said adhesive, at their respective surfaces to be bonded, thereby to bond the adherends.

22. A method according to claim 21, wherein said hot-melt adhesive further comprises at least one additive selected from the group consisting of a polymerization initiator, a polymerization promotor and a photosensitizer.

23. A method according to claim 22, wherein said self-curing unsaturated polyester resin is present in the form of the resin itself or a composition containing the resin and said at least one additive is present in the form of the additive itself or a composition containing the additive; and said curing of the adhesive is effected after the resin or the composition containing the resin is melt-blended with the additive or the composition containing the additive on the surface of the adherend.

24. A method according to claim 23, wherein the melt-blending is effected by the pressure applied, while heating, through the adherends to the resin or the composition containing the resin and the additive or the composition containing the additive which constitute the adhesive.

25. A method according to claim 21, wherein said heat is generated by high-frequency heating.

26. A hot-melt adhesive as claimed in claim 2 wherein said one or more air-drying functional groups are present in the self-curing unsaturated polyester resin at a concentration of 0.01 or more equivalent/100 g of the hot-melt adhesive.

27. A hot-melt adhesive as claimed in claim 3 wherein said self-curing unsaturated polyester resin contains double bonds at a concentration of 0.01 or more equivalent/100 g of the hot-melt adhesive.

28. A hot-melt adhesive as claimed in claim 1 wherein said thermoplastic saturated polyester has a softening point of 200° C. or less.

29. A hot-melt adhesive as claimed in claim 28 wherein said thermoplastic saturated polyester has a softening point of 120° C. or less.

30. A hot-melt adhesive as claimed in claim 18 wherein the amount of the polymerization initiator is 0.005 to 10% by weight, based on the self-curing unsaturated polyester resin.

31. A hot-melt adhesive as claimed in claim 18 wherein the amount of the polymerization promotor is 0.001 to 5% by weight based on the self-curing unsaturated polyester resin.

32. A hot-melt adhesive as claimed in claim 18 wherein the amount of the photosensitizer is 0.005 to 10% by weight based on the self-curing unsaturated polyester resin.

33. A hot-melt adhesive as claimed in claim 1 wherein said thermoplastic saturated polyester resin is selected from polyethylene terephthalate adipate, polybutylene terephthalate adipate, polyethylene terephthalate azelate, polybutylene terephthalate sebacate, polyhexamethylene terephthalate adipate, polybutylene terephthalate glutarate, polyneopentylene terephthalate dodecanedicarboxylate, polybutylene terephthalate isophthalate adipate and polybutylene terephthalate isophthalate azelate.

* * * * *